US010963098B1

(12) United States Patent
Zoubir et al.

(10) Patent No.: US 10,963,098 B1
(45) Date of Patent: Mar. 30, 2021

(54) METHODS AND APPARATUS FOR OBJECT PROFILE ESTIMATION

(71) Applicant: Apple Inc., Cupertino, CA (US)

(72) Inventors: Ahmed Zoubir, Cupertino, CA (US); David Graff, San Francisco, CA (US); Baboo Gowreesunker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 16/144,973

(22) Filed: Sep. 27, 2018

Related U.S. Application Data

(60) Provisional application No. 62/566,214, filed on Sep. 29, 2017.

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 3/04186* (2019.05)

(58) Field of Classification Search
CPC ......... G06F 3/044–0448; G06F 3/0416–04186
See application file for complete search history.

(56) References Cited

U.S. PATENT DOCUMENTS

| 5,198,623 | A | 3/1993 | Landmeier |
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |

(Continued)

FOREIGN PATENT DOCUMENTS

| JP | 2000-163031 A | 6/2000 |
| JP | 2002-342033 A | 11/2002 |
| WO | 2014/168779 A1 | 10/2014 |

OTHER PUBLICATIONS

Final Office Action received for U.S. Appl. No. 14/283,105, dated Feb. 25, 2016, 27 pages.

(Continued)

*Primary Examiner* — Patrick F Marinelli
(74) *Attorney, Agent, or Firm* — Kubota & Basol LLP

(57) ABSTRACT

This relates to methods and apparatus for estimating an object profile to improve accuracy of touch sensor panel input (e.g., reducing input position wobble for a stylus or finger translating on a surface over and between electrodes of a touch sensor panel). In some examples, the object profile estimation can begin with an initial profile estimate that can allow the object profile estimation to converge for a large range of possible input object sizes, shapes, distances, and/or orientations. The object profile information can use data from multiple frames of data acquisition as well as multiple pixels in the panel to construct the object profile estimate based on the input measurement. Specifically, the object profile can be estimated by measuring the object at various positions relative to touch pixels or nodes and gaps between touch pixels or nodes over multiple frames of sensor data and combining the measurement data of the multiple frames.

32 Claims, 19 Drawing Sheets

(56) References Cited

U.S. PATENT DOCUMENTS

| | | | |
|---|---|---|---|
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,325,160 B2 | 12/2012 | St. Pierre et al. | |
| 8,477,106 B2 | 7/2013 | Salaverry et al. | |
| 8,479,122 B2 | 7/2013 | Hotelling et al. | |
| 8,482,536 B1 | 7/2013 | Young | |
| 8,674,958 B1 | 3/2014 | Kravets et al. | |
| 8,749,504 B2 * | 6/2014 | Kolokowsky | G06F 3/044 345/173 |
| 8,754,862 B2 | 6/2014 | Zaliva | |
| 9,007,322 B1 * | 4/2015 | Young | G06F 3/044 178/18.03 |
| 9,134,836 B2 | 9/2015 | Takano et al. | |
| 9,323,449 B2 * | 4/2016 | Chen | G06F 3/0416 |
| 9,465,456 B2 | 10/2016 | Pant et al. | |
| 10,795,518 B2 * | 10/2020 | Kuan | G06F 3/044 |
| 2006/0197753 A1 | 9/2006 | Hotelling | |
| 2008/0100586 A1 | 5/2008 | Smart | |
| 2009/0058535 A1 | 3/2009 | Wilson | |
| 2009/0174675 A1 * | 7/2009 | Gillespie | G06F 3/0416 345/173 |
| 2010/0071965 A1 * | 3/2010 | Hu | G06F 3/044 178/18.06 |
| 2010/0097329 A1 | 4/2010 | Simmons et al. | |
| 2011/0025638 A1 | 2/2011 | Salaverry et al. | |
| 2011/0096003 A1 | 4/2011 | Hill et al. | |
| 2012/0050221 A1 * | 3/2012 | Kolokowsky | G06F 3/044 345/174 |
| 2012/0075243 A1 | 3/2012 | Doi et al. | |
| 2012/0200530 A1 | 8/2012 | Wu et al. | |
| 2012/0327041 A1 | 12/2012 | Harley et al. | |
| 2013/0135218 A1 * | 5/2013 | Jain | G06F 21/32 345/173 |
| 2013/0257807 A1 | 10/2013 | Harris et al. | |
| 2013/0278550 A1 | 10/2013 | Westhues | |
| 2013/0342468 A1 | 12/2013 | Hekstra | |
| 2015/0324084 A1 * | 11/2015 | Chen | G06F 3/0416 345/173 |
| 2015/0338932 A1 * | 11/2015 | Pant | G06F 3/0488 345/174 |
| 2017/0032114 A1 * | 2/2017 | Turgeman | H04W 12/06 |
| 2017/0068330 A1 * | 3/2017 | Navidpour | G06F 3/044 |
| 2017/0147164 A1 * | 5/2017 | Perez | G06F 3/0488 |
| 2018/0004320 A1 * | 1/2018 | Polishchuk | G06F 3/0412 |
| 2018/0232101 A1 * | 8/2018 | Fotopoulos | G06K 9/0002 |
| 2020/0133412 A1 * | 4/2020 | Kuan | G06F 3/0418 |

OTHER PUBLICATIONS

Final Office Action received for U.S. Appl. No. 14/964,514, dated Jan. 11, 2018, 14 pages.

Michael et al. "Super-Resolution Reconstruction of Image Sequences", IEEE Transactions on Pattern Analysis and Machine Intelligence, vol. 21, No. 9, Sep. 1999, pp. 817-834.

Non-Final Office Action received for U.S. Appl. No. 14/283,105, dated Sep. 25, 2015, 37 pages.

Non-Final Office Action received for U.S. Appl. No. 14/964,514, dated Jul. 13, 2017, 11 pages.

Notice of Allowance received for U.S. Appl. No. 14/283,105, dated Jun. 22, 2016, 7 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

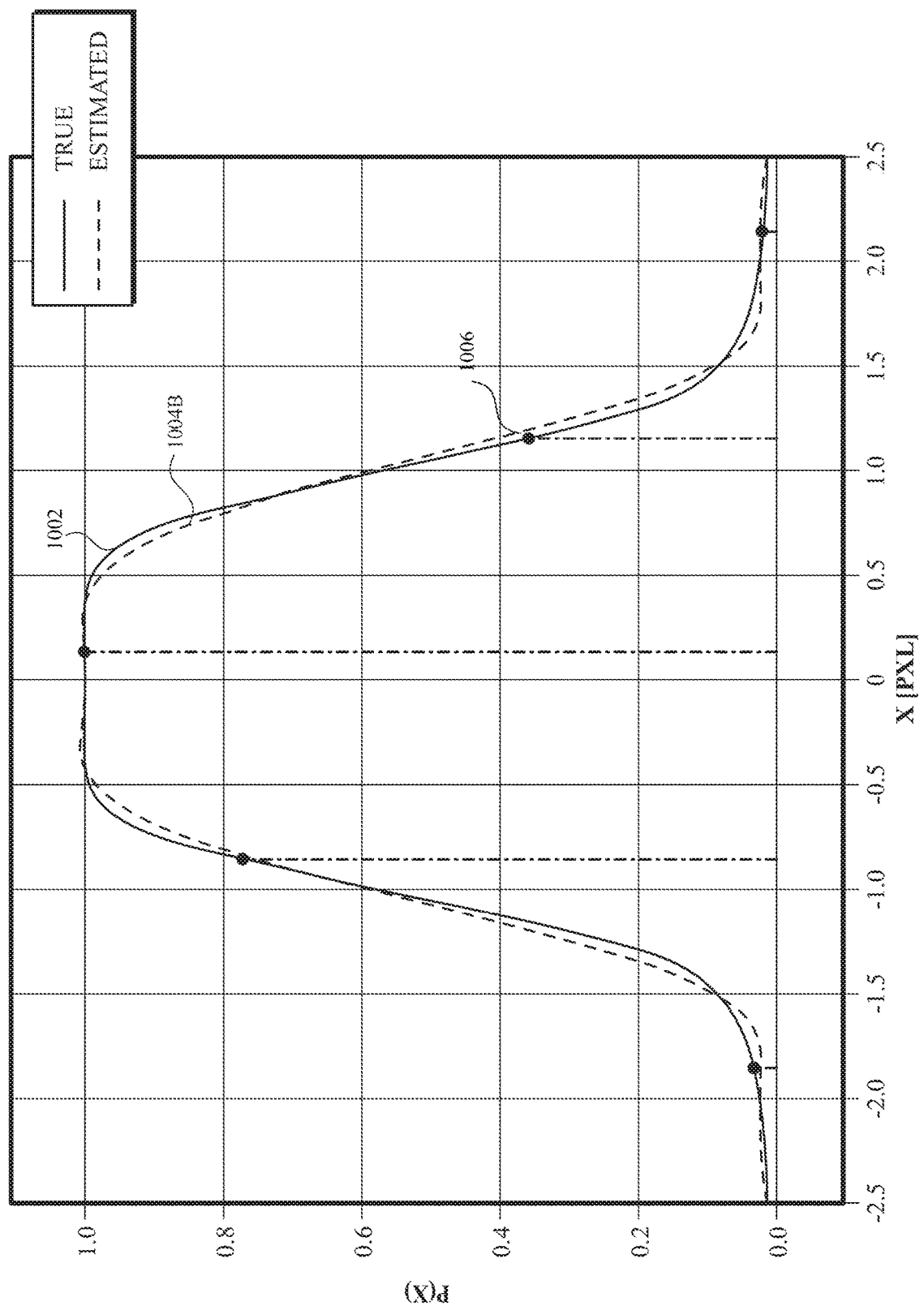

METHODS AND APPARATUS FOR OBJECT PROFILE ESTIMATION

CROSS REFERENCE TO RELATED APPLICATIONS

This application claims the benefit under 35 USC 119(e) of U.S. Provisional Patent Application No. 62/566,214, filed Sep. 29, 2017 the contents of which are incorporated herein by reference in their entirety for all purposes.

FIELD OF THE DISCLOSURE

This relates to touch sensor panels used as input devices for computing systems, and more particularly, to techniques for providing accurate position calculation for proximate objects having different physical characteristics.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the touch sensor panel or integrated with the touch sensor panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. The effectiveness of detecting user input, however, can depend on the ability to accurately calculate the position of the input object (e.g., a finger, stylus, or other object) on a touch sensor panel. It can be advantageous to have a touch sensing device that can accurately calculate the position of styli as well as fingers at a similar level of precision.

SUMMARY OF THE DISCLOSURE

This relates to methods and apparatus for estimating an object profile to improve accuracy of touch sensor panel input (e.g., reducing input position wobble for a stylus or finger translating on a surface over and between electrodes of a touch sensor panel). In some examples, the object profile estimation can begin with an initial profile estimate that can allow the object profile estimation to converge for a large range of possible input object sizes, shapes, distances, and/or orientations. The object profile information can use data from multiple frames of data acquisition as well as multiple pixels in the panel to construct the object profile estimate based on the input measurement. Specifically, the object profile can be estimated by measuring the object at various positions relative to touch pixels or nodes and gaps between touch pixels or nodes over multiple frames of sensor data and combining the measurement data of the multiple frames.

BRIEF DESCRIPTION OF THE DRAWINGS

FIGS. 10A-10B illustrate an exemplary progression of an object profile estimate algorithm.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
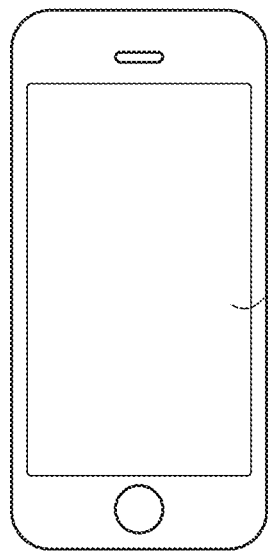
FIGS. 1A-1D illustrate example systems in which the object profile estimation according to examples of the disclosure can be implemented.
Figure 1B:
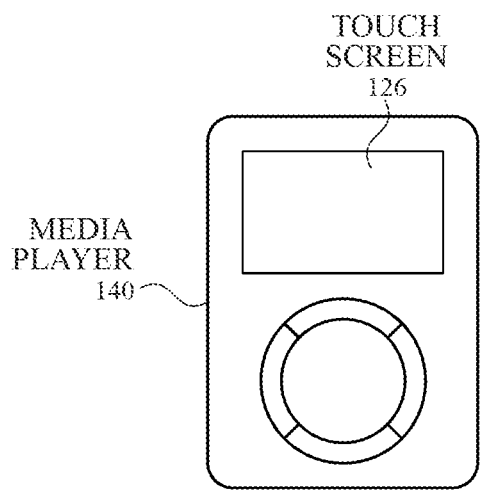
Figure 1C:
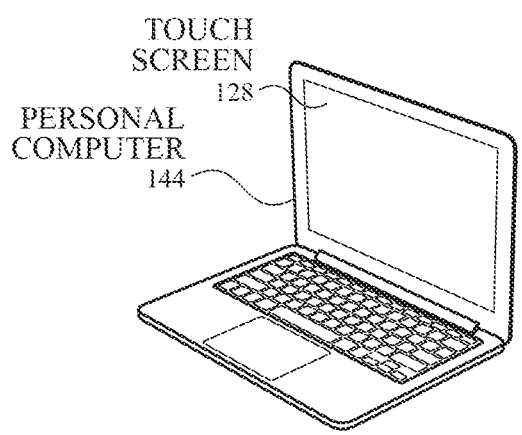
Figure 1D:
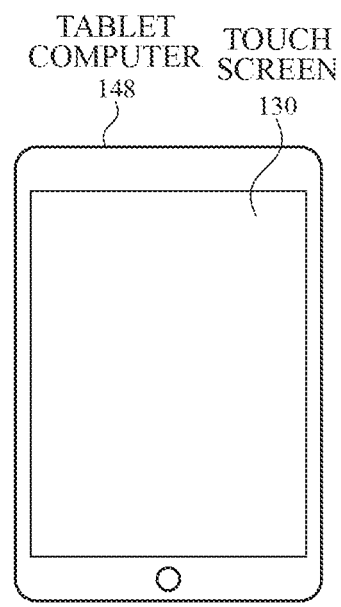

FIGS. 1A-1D illustrate example systems in which the object profile estimation according to examples of the disclosure can be implemented. FIG. 1A illustrates an example mobile telephone 136 that includes a touch screen 124 and other computing system blocks that can implement object profile estimation according to various examples. FIG. 1B illustrates an example digital media player 140 that includes a touch screen 126 and other computing system blocks that can implement object profile estimation according to various examples. FIG. 1C illustrates an example personal computer 144 that includes a touch screen 128 and other computing system blocks that can implement object profile estimation according to various examples. FIG. 1D illustrates an example tablet computing device 148 that includes a touch screen 130 and other computing system blocks that can implement object profile estimation according to various examples. The touch screen and computing system blocks that can implement the object profile estimation can be implemented in other devices including in wearable devices.

In some examples, touch screens 124, 126, 128, and 130 can be based on self-capacitance. For example, a touch screen can include a plurality of touch pixels or node, each touch pixel or node corresponding to a particular location on the touch screen at which touch or proximity (i.e., a touch or proximity event) is to be sensed. During operation, the touch pixel or node can be stimulated with an AC waveform, and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen. While different examples of the disclosure may be described in terms of pixelated touch nodes or row/column touch electrodes, it should be understood that the object profile estimation can be applied to other physical arrangements of touch sensors without departing from the present disclosure. In addition, the object profile estimation described in the present disclosure can also be used with touch sensors that operate in a self-capacitance mode, a mutual capacitance mode, or a combination or both self-capacitance and mutual-capacitance modes.

Figure 2A:
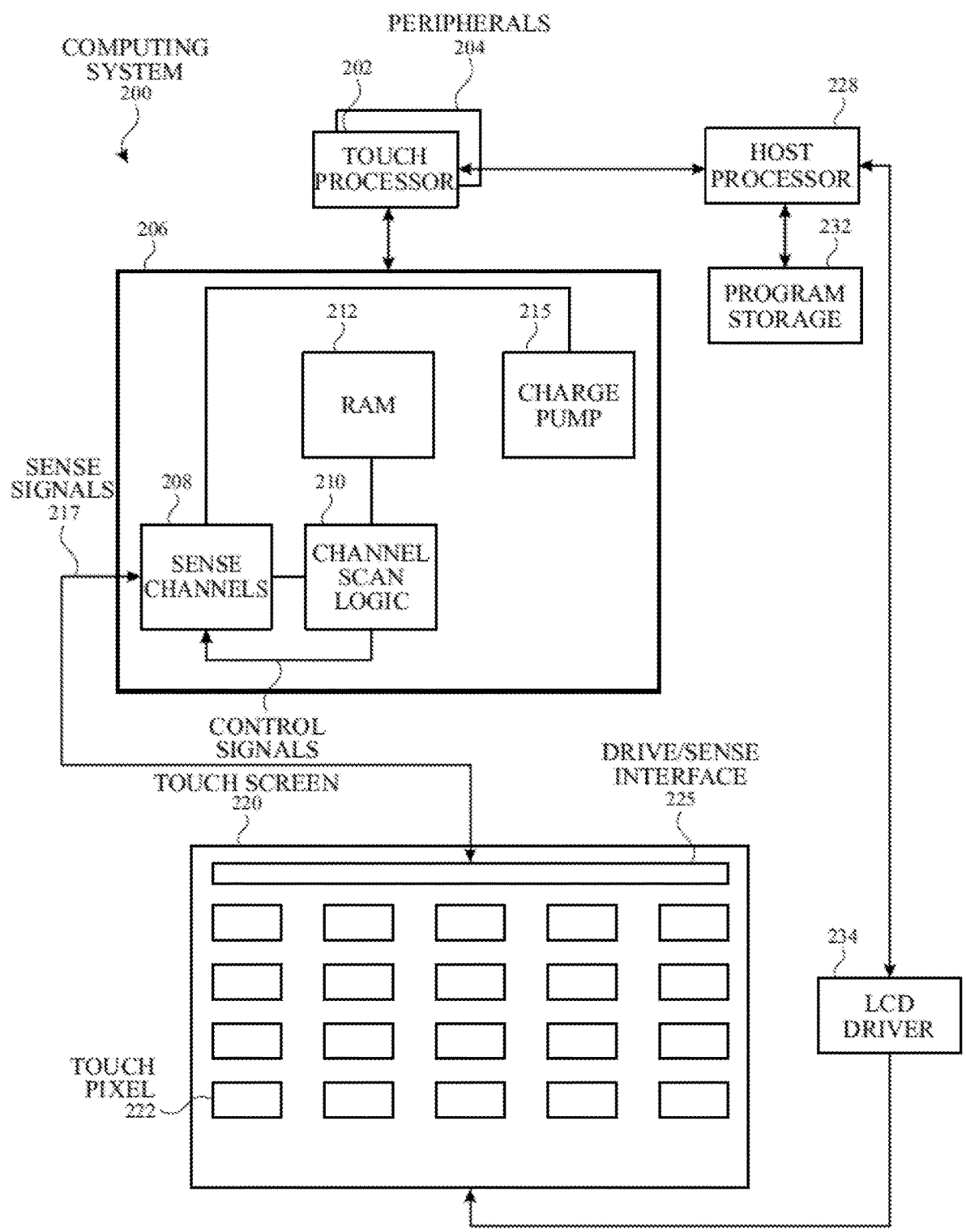
FIG. 2A illustrates a block diagram of an example computing system that illustrates one implementation of an example touch screen according to examples of the disclosure.

FIG. 2A is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a pixelated touch screen, and can include touch sensing circuitry that can include a capacitive sensing medium having a plurality of touch pixels 222. Touch pixels 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixels 222) as "touch pixels" can be particularly useful when touch screen 220 is viewed as capturing an "image" of touch. In other words, after touch controller 206 has determined an amount of touch detected at each touch pixel 222 in touch screen 220, during a particular measurement interval the pattern of touch pixels in the touch screen at which a touch occurred during a particular measurement interval can be thought of as an "image" of touch (e.g., a pattern of fingers touching the touch screen). In some examples, each "image" of touch captured during a particular measurement interval can thought of as a frame in a sequence of frames captured at the touch screen.

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 2B:
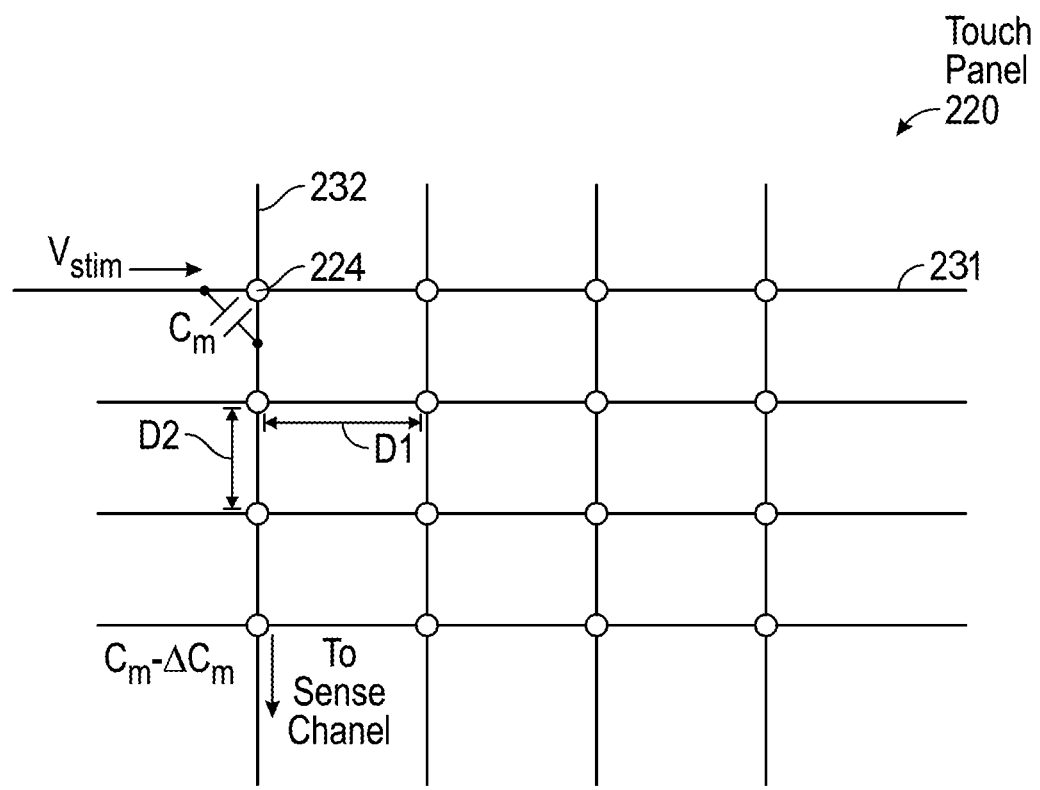
FIG. 2B illustrates an example touch screen configuration that can be used with the example computing system illustrated in FIG. 2A.

FIG. 2B illustrates an exemplary mutual capacitance touch screen 220 that can correspond to the touch screen 220 illustrated in FIG. 2A. In the example of FIG. 2B, touch screen 220 can include an array of touch nodes 224 formed at the crossing points of drive lines 231 and sense lines 232, although as discussed above, it should be understood that other touch node configurations can be used. The touch nodes 224 can correspond to the touch pixels 222 described in the pixelated sensor configuration shown in FIG. 2A above. During a mutual capacitance scan, one or more drive lines 201 can be stimulated to drive the touch screen 220. Touch nodes 224 can have a mutual capacitance $C_m$ at the touch nodes 224 when there is no object touching or hovering over touch nodes 206. When an object touches or hovers over the touch node 224 (e.g. a finger or a stylus), the mutual capacitance Cm can be reduced by ΔCm, i.e., ($C_m$–$\Delta C_m$), corresponding to the amount of charge shunted through the object to ground. This mutual capacitance change can be sensed by sense channels 108 and can be used to detect a touch or hover event and its location. Although described and illustrated as a mutual capacitance touch sensor panel, the touch screen 220 can be configured in other ways. For example, touch screen 220 can be configured to detect self-capacitance, or to detect both self-capacitance and mutual capacitance. As stated above, while different examples of the disclosure may be described in terms of pixelated touch nodes or row/column touch electrodes, it should be understood that object profile estimation can be applied to other physical arrangements of touch screens without departing from the present disclosure. In addition, the object profile estimation described in the present disclosure can also be used with touch sensors that operate in a self-capacitance mode, a mutual capacitance mode, or a combination or both self-capacitance and mutual-capacitance modes. For example, a single touch screen may include both pixelated touch nodes and row/column touch electrodes, each physical arrangement configured to perform self-capacitance measurements, mutual capacitance measurements, or a combination of both.

Figure 3:
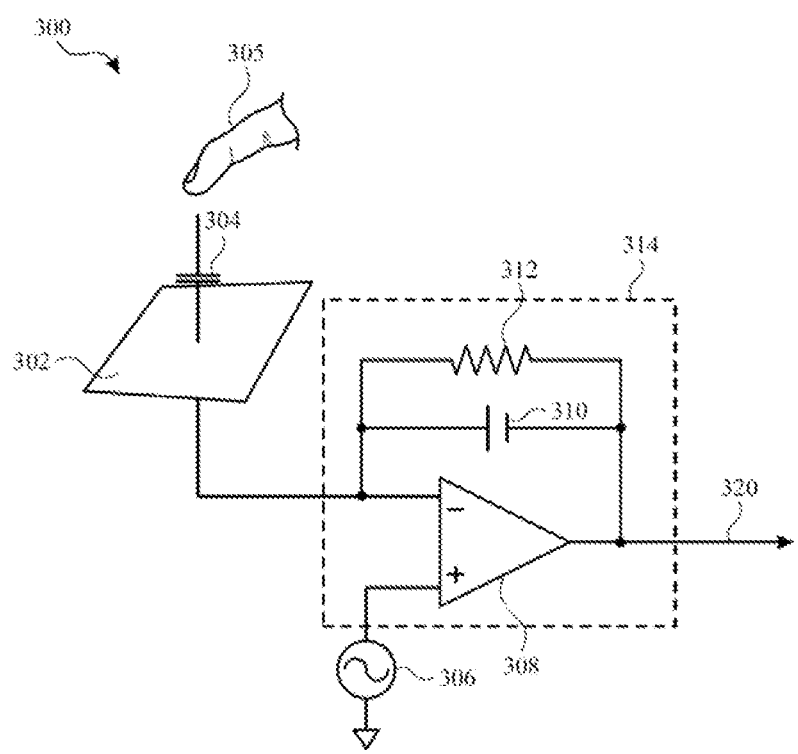
FIG. 3 illustrates an exemplary touch sensor circuit corresponding to a self-capacitance touch pixel electrode and sensing circuit according to examples of the disclosure.

FIG. 3 illustrates an exemplary touch sensor circuit 300 corresponding to a self-capacitance touch pixel electrode 302 and sensing circuit 314 according to examples of the disclosure. Touch pixel electrode 302 can correspond to touch pixel 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314 (which can correspond to sense channels 208). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 ($V_{ac}$) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor (e.g., touch controller 206) to determine the presence of a touch event, or the output can be inputted into a discrete logic network to determine the presence of a touch or proximity event. It is understood that a "touch event," as used in this disclosure, encompasses a finger or object touching the touch sensor panel (i.e., being in physical contact with the touch sensor panel), as well as the finger or object being in proximity to, but not touching, the touch sensor panel (e.g., hovering over the touch sensor panel). Touch sensor circuit 300 can represent the structure and/or operation of touch pixel sensing of the examples of the disclosure.

In some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., OLED displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

While the discussion in this disclosure focuses on touch screens, it is understood that some or all of the examples of the disclosure can similarly be implemented in a touch sensor panel (i.e., a panel having touch sensing circuitry without display circuitry). For the purposes of the present disclosure, the terms touch sensor panel and touch screen may be used interchangeably, and without limitation based on the specific terminology used in describing a particular example.

Figure 4:
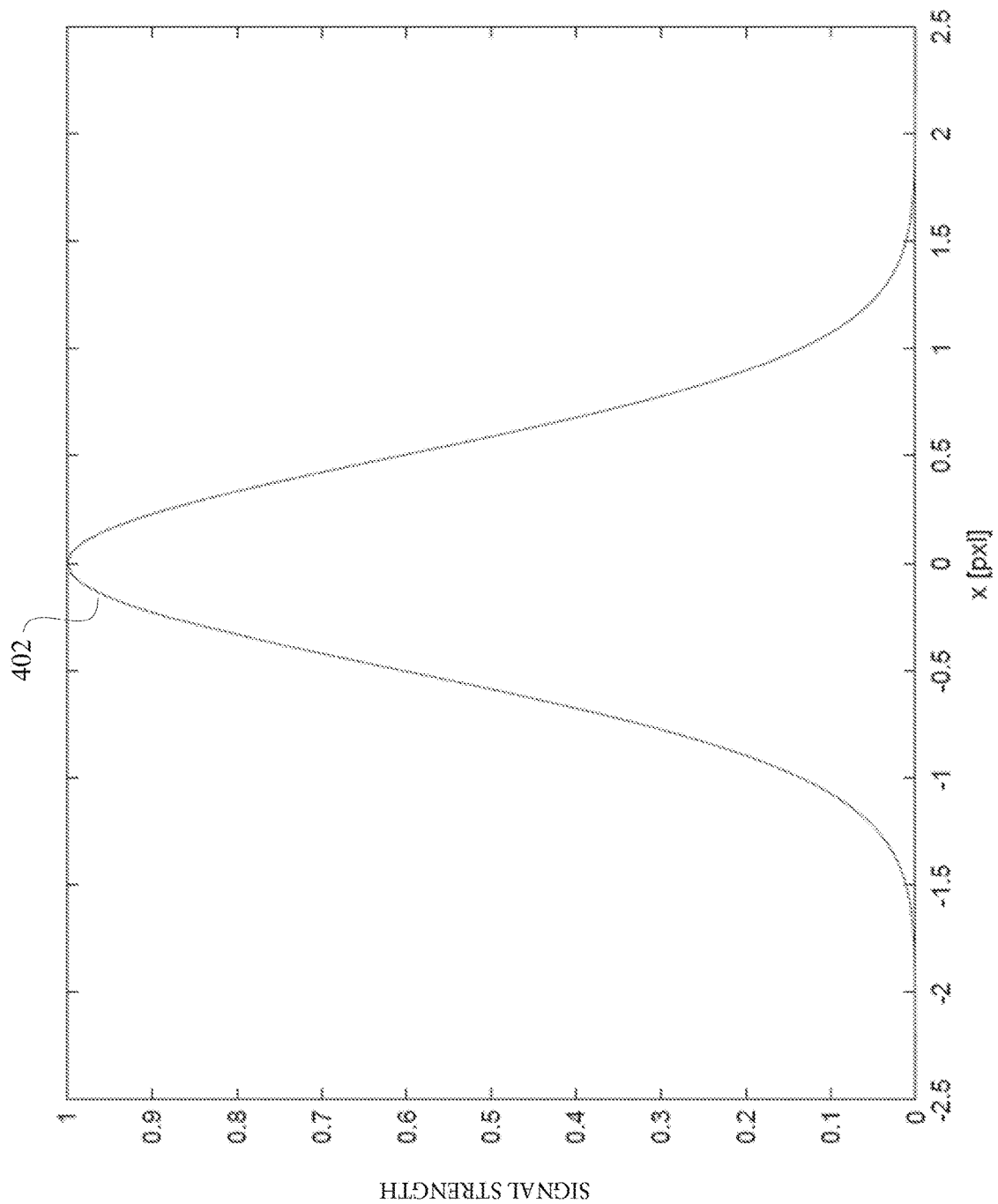
FIG. 4 illustrates a plot of an exemplary true object profile according examples of the disclosure.

FIG. 4 illustrates a plot of an exemplary true object profile according to examples of the disclosure. The true object profile 402 represents the signal that a touch node or pixel at any location with respect to the center of the object would measure plotted as signal strength vs. distance from the center of the object (e.g., the location of peak signal strength). As shown in FIG. 4, the signal strength can be normalized so that the peak or center of the object is shown with a value of 1. This normalized and dimensionless representation is provided for the purposes of illustration and explanation, and it should be understood that a true object profile 402 can be represented in other ways such as a measured voltage, measured charge, digital counts, or the like without departing from the scope of the present disclosure. Another way to conceptualize the true object profile 402 is to imagine that the true object profile represents the measurements that would be obtained by a moving pixel or sense node that could be swept continuously along the x-axis to measure a stationary object centered at the position x=0. Thus, the true object profile 402 can have a corresponding signal value for every position along the x-axis and can be considered a continuous object profile. Again, the true object profile 402 as illustrated is a representation of a signal profile for the object that would be obtained if a measurement of the object was made at every location along the x-axis to form a continuous curve. The scale of the x-axis shown in FIG. 4 is referenced to exemplary touch nodes or pixels centered at x-axis positions −2, −1, 0, 1, and 2 that can represent, for example, the pitch between touch pixels (e.g., 222 in FIG. 2A above) or touch nodes (e.g., D1, D2 in FIG. 2B above). Ideally, as an object (such as a stylus or finger) traverses between two touch pixels or nodes of a touch screen, the measured values from the sensors would land exactly on the curve of the true object profile 402. However, due to practical implications of touch sensor pixel and/or node configurations that have empty space between adjacent sense nodes or pixels, the measurements of an object can vary depending on where the object is positioned relative to the spaces and touch nodes and/or pixels of the touch sensor panel (e.g., a stronger signal may be detected when the object is directly positioned above a touch pixel or node). It should be understood that although the true object profile 402 is illustrated as a profile across only a single dimension x, this representation is provided primarily for the purposes of illustration. As shown in FIGS. 2A and 2B above, a touch screen can have touch nodes arranged in a two-dimensional arrangement, and accordingly measurement values are also obtained in two dimensions. Thus, the true profile 402 can also be represented as a function of two-dimensional position relative to the object. It should be understood that throughout the discussion below of object profiles, the one dimensional representations (e.g., plotted against a single dimensional axis) can be readily replaced with two dimension representations without departing from the scope of the present disclosure.

FIGS. 5A-5B and 6A-6D illustrate exemplary measurement characteristics of signals measured by touch sensor panels having discrete touch pixels and/or touch nodes. As will be described in more detail below with regards to FIGS. 7-10B, object profile estimation can be used to correct for non-uniformity in sensor sensitivity by fitting measured data at sensors to an estimate of the true object profile as determined by combining measurements from multiple frames of touch screen data capture, thereby allowing the touch sensor panel to more accurately interpret the sensor information measured at the touch panel.

Figure 5A:
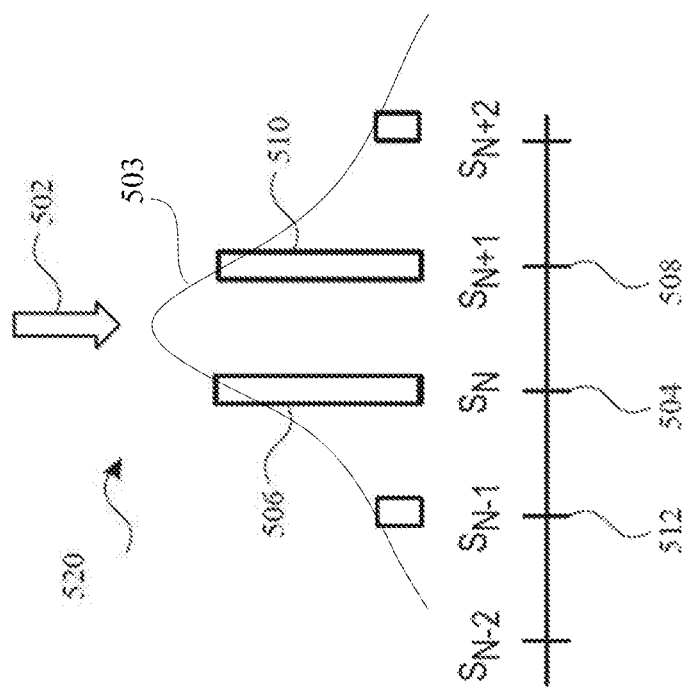
FIGS. 5A-5B illustrate exemplary signal measurement variations that can occur based on the position of an object relative to touch nodes and spaces between touch nodes according to examples of the disclosure.
Figure 5B:
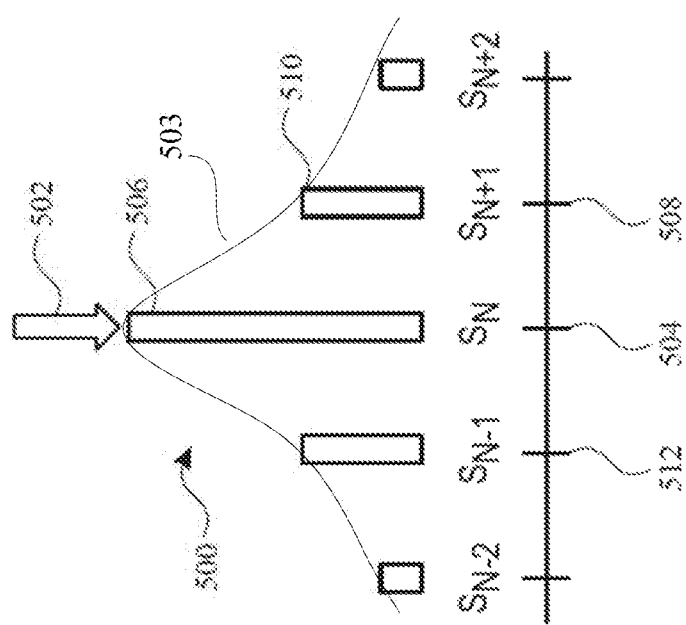

FIGS. 5A and 5B illustrate measurement characteristics that can occur based on the position of an object (e.g., a finger or a stylus) relative to touch nodes n−2 to n+2 and spaces between those touch nodes according to examples of the disclosure. For example, the peak signal strength may be stronger when an object is positioned directly above one of the touch nodes compared to when the object is positioned directly above a gap between two touch nodes. These sensor measurements (e.g., obtained at touch nodes) can be used to detect position of the object 502 relative to the touch sensor panel. As will be explained in more detail below, by generating an object profile based on multiple touch images or frames of the object at different positions relative to the sensors, the sensor data from the touch nodes n−2 to n+2 can be fit to the object profile to improve the position estimation of the object 502.

FIG. 5A illustrates a signal profile 500 of object 502 positioned over a central touch node 504 of a touch sensor panel. The central node, node n 504, can be the node that receives the largest amplitude signal, $S_n$ 506. Node n+1 508 can be the node that receives the second largest amplitude signal, $S_{n+1}$ 510. For the signal measurements illustrated in FIGS. 5A-5B, for example, node n+1 508 can be the node adjacent to node n 504. In the example of FIG. 5A, node n+1 508 can be the node to the right of node n 504 and each node continuing to the right can be numbered sequentially as n+2, n+3 . . . n+m, (with only nodes n+1 and n+2 being shown in the illustration). The node adjacent to the central node 504, but on the opposite side of node n+1 508, can be node n−1 512. In the example of FIG. 5A, node n−1 512 can be the node to the left of node n 504 and each node continuing to the left can be numbered sequentially as n−2, n−3 . . . n−k (with only nodes n−1 and n−2 being shown in the illustration). The true signal profile 503 can be non-linear, such that node n 504 (e.g. the node most proximate to the object) receives the largest amplitude signal 506 and the signal diminishes for each node as the distance increases from the central node 504, in a non-linear fashion. Thus, due to the non-linear signal profile, the amplitude drops sharply as the distance from the object to a given node increases.

FIG. 5B illustrates a signal profile 520 of object 502 positioned on a touch screen less than half the pitch distance between two adjacent nodes. Central node, node n 504, can be the node that receives the largest amplitude signal 506. Node n+1 508 can be the node that receives the second largest amplitude signal, $S_{n+1}$ 510. As in FIG. 5A, node n+1 508 in FIG. 5B can be the node to the right of node n 504 and each node continuing to the right can be numbered sequentially as n+2, n+3 . . . n+m (with only nodes n+1 and n+2 being shown in the illustration). In the example of FIG. 5B, node n−1 512 can be the node to the left of node n 504 and each node continuing to the left can be numbered sequentially as n−2, n−3 . . . n−k (with only nodes n−1 and n−2 being shown in the illustration). As shown in FIG. 5B, although the object 500 can have the same true profile 503 as illustrated in FIG. 5B, the characteristics of the measurements can differ greatly when the object is not located directly above a touch node. For example, rather than the measurements showing a clear peak at the location of the object, the measurement values for node n 504 and node n+1 508 have approximately the same measured signal strength 506 and 510. Also, both of the two highest measured signal values 504 and 508 have a significantly lower measurement value than the peak value shown in FIG. 5A. Accordingly, algorithms that use the node measurement values (e.g., centroid for calculating object position) can exhibit wobble, as described below with regard to FIGS. 6A-6D.

Figure 6B:
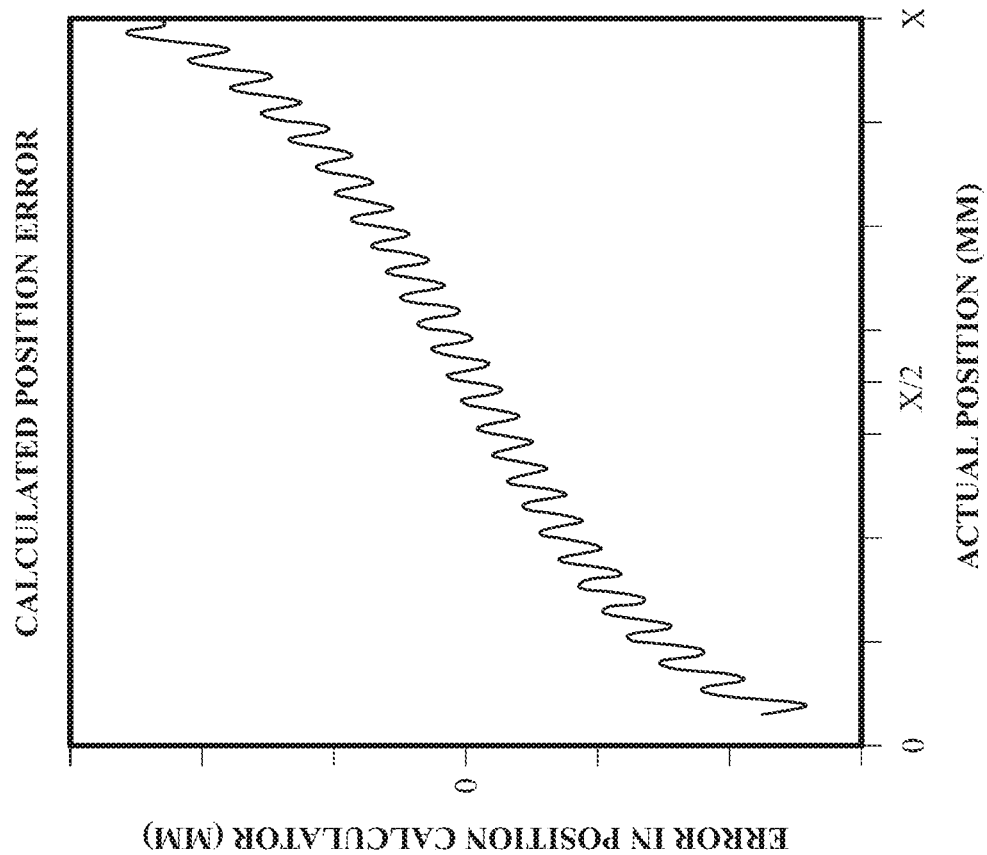
FIGS. 6A-6D illustrate exemplary measurement characteristics of a touch sensor panel comprising discrete sensing nodes according to examples of the disclosure.
Figure 6A:
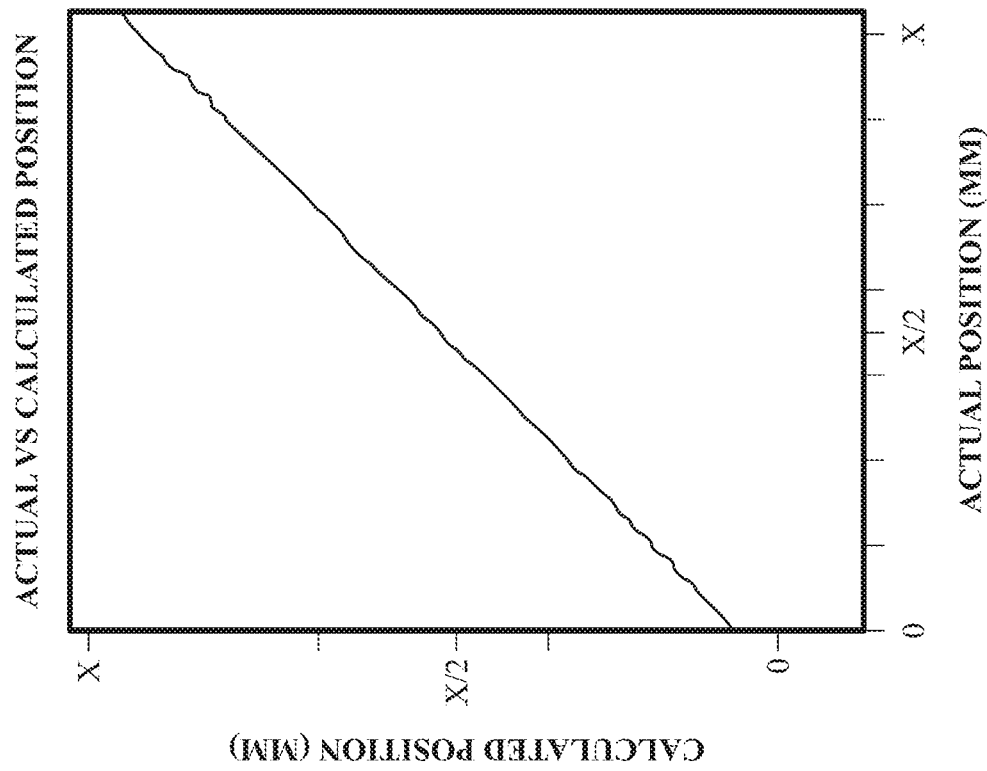

FIGS. 6A-6D illustrate exemplary measurement characteristics of a touch sensor panel comprising discrete sensing nodes according to examples of the disclosure. FIG. 6A illustrates a plot of the calculated position of the object (e.g., finger or stylus) versus the actual position of the object when calculating position by taking a weighted or unweighted centroid including data from all nodes along a given axis. In an ideal case, where calculated position and actual position are the same, the plot can be a straight with a slope of 1. However, because of variations in the coupling between the object and the touch sensor panel and the algorithm used to calculate object position, effects such as a wobble in the plot of FIG. 6A can occur as the object moves between nodes along an axis. For example, a stylus with a thin tip may not register a signal when it is located in spaces in between touch nodes of pixels of the touch sensor panel, and only register a signal when located directly above a touch node. As a result, the measured position plotted of the thin stylus against actual position may not form a perfectly linear plot. In other words, the signal coupling between the object and touch sensor panel and the calculated position metric can introduce an error in calculated position (discrepancy with actual position) that can cause a wobble to be displayed when plotting the actual versus calculated position. In general, a fingertip can usually (but not always) be larger than the tip of a stylus, and thus capacitance measurements of the finger(s) can be spread across a larger area of the touch sensor panel due to the larger size. Similarly, different passive stylus designs may have different tip sizes and shapes and corresponding signal profiles as measured at the touch sensor panel. In some examples, a stylus profile can also change as the tip of the stylus is worn by use, and object profile estimation can be used to detect the changing profile of the stylus as it wears. While a stylus is described in some examples below, it should be understood that similar calculations of centroid and wobble can be performed for a finger (or multiple fingers) or other objects proximate to the touch sensor panel.

Some of the calculated position error can result from, for example, the number of nodes on either side of the node nearest to the stylus. For example, when the object is at the midpoint of the x-axis of the touch sensor panel, i.e. at $x=X/2$, there can be an equal number of touch nodes on either side contributing to the weighted centroid calculation, and as a result the object can be symmetrically measured. When the object is close to $x=0$, however, there can be more nodes receiving signal on the right-hand side of the object and as a result, the object can be asymmetrically measured and the position to be calculated can be biased more to the right than the actual position. As a result, the error in position, defined as $x_{actual}-x_{measured}$, can be negative when the object is closer to $x=0$. On the other hand, when the object is closer to $x=X$, there can be more nodes receiving signal on the left-hand side of the object and as a result, there can be a bias to the left. Thus, the error in position can be positive when the object is close to $x=X$.

FIG. 6B illustrates an exemplary plot of the error in position calculation versus the actual position when calculating position by taking a weighted centroid including all nodes along a given axis. As discussed above, the error can be generally negative between $x=0$ and $x<X/2$, can be zero at $x=X/2$, and can be positive between $x>X/2$ and X. The oscillation of the error plot can be representative of the wobble due to remaining error in calculated position.

Figure 6D:
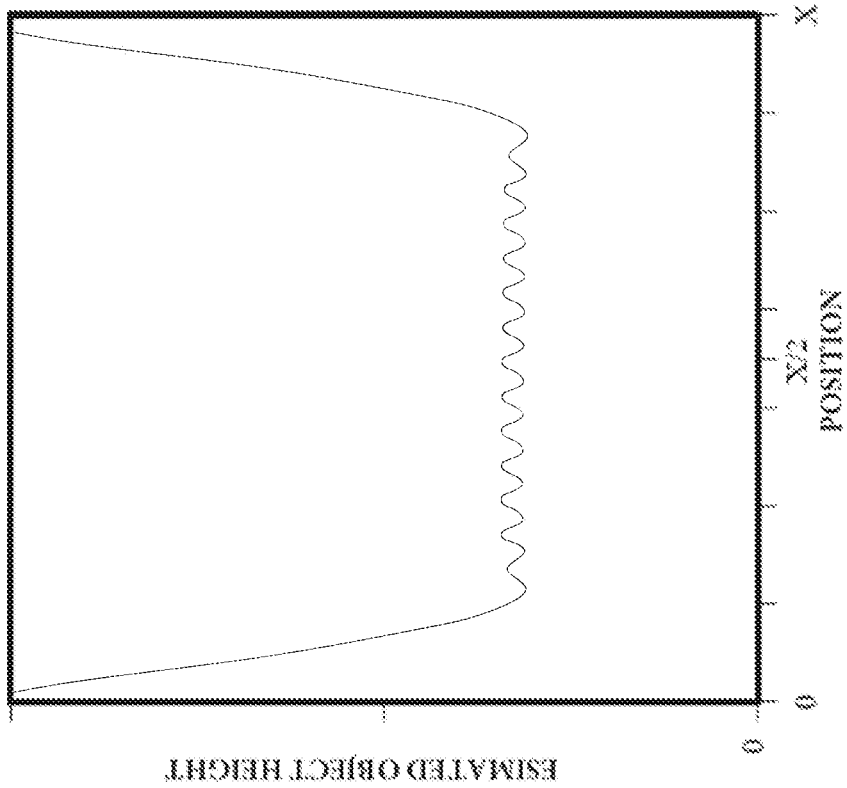
Figure 6C:
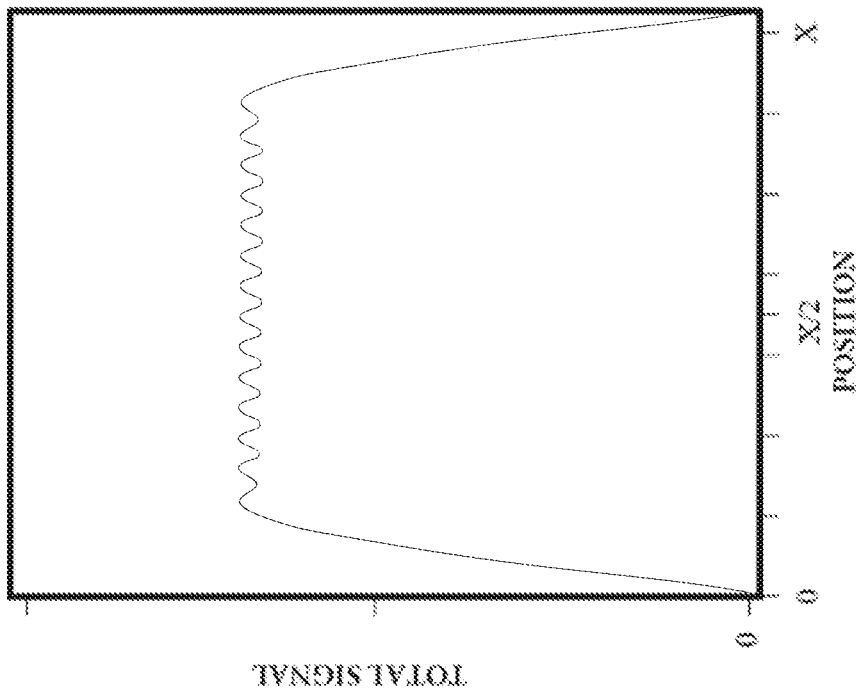

FIG. 6C illustrates an exemplary plot of total signal measured at the touch sensor panel. Depending on the relative position of an object to the sensor nodes in the panel, the total signal measured based on the object can fluctuate with a wobble similar to the error in position calculation. For example, the total signal values (e.g., summing the signals from $S_{N-2}$ to $S_{N+2}$) is shown to be larger in FIG. 5A where the object 502 is directly above one of the sensors 504 than as compared to FIG. 5B where the object is located between two sensors 504 and 508. In some examples, a threshold value for total detected signal may be used by the panel, e.g. for proximity detection, and the fluctuation in total detected signal may cause the signal to rise and fall above the threshold value despite a fixed object distance simply based on where the object is relative to the center of individual sense nodes. Furthermore, FIG. 6C illustrates that near the edges of the display (e.g., at positions 0 and X0, the total signal can become significantly lower because there may be fewer sensors beneath the object. FIG. 6D illustrates a complementary measurement of an object at a fixed height as it moves across the panel, which can also exhibit a wobble as well as edge effects due to the reduced number of sensors.

FIGS. 6A-6D above illustrated exemplary signal profiles for an object proximate to a touch sensor panel according to examples of the disclosure. As discussed above, the signal coupling between a stylus or one or more fingers, or another object and touch nodes of the touch sensor panel can affect the calculation of the position of a stylus touching or hovering over the touch sensor panel. A signal profile can be formed for a given stylus (or finger, or other object) and touch sensor panel. For example, the pitch of the touch sensor panel and the shape of the stylus tip (or finger, or other object) can change the signal profile. FIGS. 6A-6D above illustrate an exemplary signal profile and measurement error characteristics (e.g., wobble) for an exemplary signal profile of a stylus. As will be discussed in more detail below, different styluses, fingers, or other objects can have corresponding different continuous signal profiles (as described above with regard to FIG. 4) with different characteristics. In general, having knowledge about the expected characteristics of sensed data corresponding to a particular object can give increase confidence in interpreting sensor data from the object. As will also be described in more detail below in connection with FIGS. 7-10B, a technique for estimating a signal profile for different object shapes and sizes can be used to improve interpretation of object measurements by discrete sensors in a touch sensor panel. In addition to object shapes and sizes, in some examples, the height of the object above a touch sensor panel can affect the signal profile resulting from the object (e.g., a detectable signal may be spread over more sensors when the object is nearby, and fewer sensors when the object is far away) Similarly, the tilt of an object can affect distribution of the sensed signal at the sensors (e.g., a symmetric distribution when the object is perpendicular to the sensors, and a skewed distribution when the object is tilted relative to the sensors). Furthermore, two fingers being held together may have a similar size to a thumb, but may produce a different signal profile such as a profile with multiple peaks as opposed to a single peak. Using object profile estimation, it can be possible to distinguish between an input made by two fingers rather than a thumb. For example, a thumb swipe may be used to move a cursor, while a two finger swipe may be used to control a scroll bar. Object profile estimation can assist a touch sensor panel in distinguishing these two types of inputs. Although reference may be made in the description below to a signal profile implying a size and shape of an object, it should be understood that the signal profile can also represent information about the tilt and height of the object. Furthermore, it should be understood that multiple profiles can be estimate when multiple input objects (e.g., multiple fingers, a finger and a stylus, etc.) are being detected simultaneously. As should be understood from FIGS. 5A-6D above, analyzing touch input data based on individual touch measurements performed at discrete touch sensors can result in non-uniform sensitivity of a panel. Further, as explained above, if the continuous profile of the object providing input to the touch panel is known, the effects of non-uniform sensitivity associated with the touch sensor panel can be reduced or eliminated. Accordingly, FIGS. 7-10B below will further disclose techniques for continuous profile estimation from discrete sensor data according to examples of the disclosure.

Figure 7:
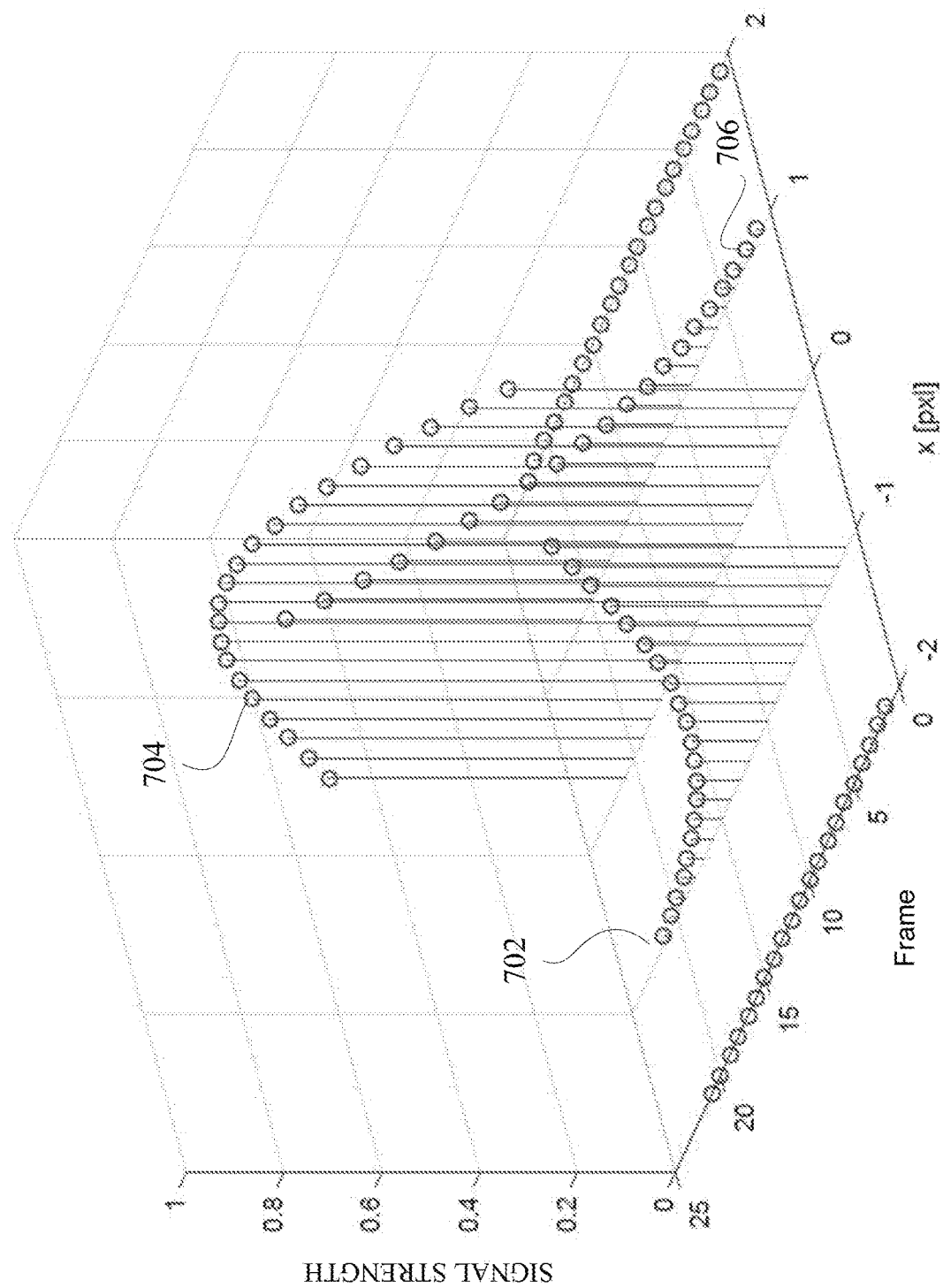
FIG. 7 illustrates an exemplary plot of sensor data obtained over multiple frames based on a moving object that can be used to calculate a continuous profile based on discrete data measurements according to examples of the disclosure.

FIG. 7 illustrates an exemplary plot of sensor data obtained over multiple frames based on a moving object that can be used to calculate a continuous profile based on discrete data measurements according to examples of the disclosure. The x-axis values −2, −1, 0, 1, and 2 can correspond to the position of five touch sensors along an axis in a touch sensor panel, similar to the examples in FIGS. 5A-5B. The plot in FIG. 7 illustrates pixel measurement values at five pixels along the x-axis, with non-zero sensed signal values occurring at positions −1, 0, and 1. The time axis values can correspond to measurement frames, where time=1 corresponds to the first measurement frame, and time=20 corresponds to the twentieth measurement frame in the exemplary sequence of FIG. 7. The measurement frames can represent a collection of all sensor data collected at the touch nodes of a touch sensor panel during a particular time interval. Depending on the measurement technique used, the touch nodes can all be measured simultaneously, or alternatively scanned in quick succession such that the measured signals at the touch nodes represent a snapshot in time of the position of one of more objects touching and/or hovering above the touch sensor panel. The plotted values can correspond to an object starting at position x=−0.5 at time=1 and moving at a uniform rate between x=−0.5 and x=0.5 between time=1 and time=20. The height of each of the line segments ending in an open circle can correspond to a normalized signal strength received at each of the pixels during a particular measurement frame, where a value of 1 corresponds to the peak value (e.g., when the object is directly over the sensor at position x=0). Based on the above described object movement profile between x=−0.5 and x=0.5, the signal strength values 702 of the sensor at x=−1 are shown to gradually decrease in value as the object moves farther away from x=−1. The signal strength values 704 of the sensor at x=0 gradually increase until the object reaches a position directly above the sensor at x=0 (between time=10 and time=11), and gradually decrease as the object moves away from the center of the pixel at x=0. The signal strength values 706 of the sensor at x=1 show the inverse of sensor values 702 of the sensor at x=−1 where the peak value is reached at time=20 (e.g., corresponding to the object at position x=0.5). As can be seen in the graph, an overall curve of signal strength (e.g., length of line segments) vs. distance of the object from the sensor can be determined from sensor data and movement of the object over a distance on the order of the sensor pitch.

The estimated profile of the object, which can be considered a best estimate of the true profile as illustrated in FIG. 4, can be modeled and calculated using different techniques known in the art. One approach is to parameterize the true object profile with a finite number of parameters to represent the profile. The parameterization may be nonlinear such as a Gaussian, or the parameterization can be linear in the parameters represented by weighting parameters and basis functions (e.g., polynomial functions, sinusoidal functions, or the like) where the parameters represent the coefficients of the basis functions that when summed together can be used to represent the object profile. In other words, updating the object profile can consist of updating the values of the parameters that represent the object profile, and the number of parameters can be sufficiently low to allow for relatively efficient computation of the object profile from the measurement data of a current frame as well as measurement data of previous frames as illustrated in FIG. 7 above.

At a high level, for the parameterized representation of an object profile, the calculation of the object profile is performed by calculating parameter values that maximize the probability that the measured sensor data (e.g., measured at the current frame and previous frames) is consistent with both a determined progression of the position of the object (e.g., based on determined positions at the current frame and previous frames) and the calculated object profile progression (e.g., how the profile changes over multiple successive frames of captured data). It should be noted that the position of the object is not known in advance (e.g., the user can move their finger(s) or stylus freely to any position on a touch screen at any time). For this reason, a linear parameterization may not be suitable to model the progression of the object position. Therefore, in addition to being used to calculate the object profile, the sensor measurement data can also be evaluated to determine the object position (e.g., the location of peak signal for a single finger or stylus). In the case of a single finger or stylus, the determined object position can coincide with the peak of the object profile and thus for the purposes of evaluating the probability that sensor measurements coincide with the object profile, the object profile can be shifted to be centered on the determined object position. In some examples, a brute force approach can be used to find the best fit between the object profile, determined object position, and sensor measurement data by trying to simultaneously solve for both object position and parameter values of the object profile parameterization. In some examples, known optimization techniques such as the use of a Kalman filter, Extended Kalman filter, Unscented Kalman filter, modified Kalman filter, or constrained Kalman filter can be used for determining the best fit between the measurement data and the representations of the object profile and object movement path. The appropriate Kalman filter variant can be selected depending on the characteristics of the functions used to model the object profile and the object movement path, as well as whether any constraints are placed on the parameters. For example, if the object profile and movement path are represented by a mix of linear and non-linear functions, the extended Kalman filter, Unscented Kalman filter, or a modified Kalman filter may be used. If constraints are also applied to the parameters representing the object profile and/or movement path, a constrained Kalman filter can be used to account for those constraints. In some examples, a neural net can be used to calculate the object profile progression and object position progression based on the sensor data for the current frame (e.g., most recently captured) and previous frames. Some exemplary of constraints on the parameters will be discussed in more detail below.

The parameters used to describe the object profile can be selected such that the one or more of the parameters are constrained into being consistent with some prior knowledge or assumptions regarding the behaviors and/or characteristics of each of the measured sensor data, the determined movement path, and the calculated object profile. As a simple example, the object profile can be constrained to have only positive values. As another example, the object profile can be constrained to have a single peak and to monotonically decrease as the distance from the peak increases. In a two-dimensional representation of an object profile, this monotonic decrease can be described as an outwardly pointing gradient. This can be an appropriate constraint because it can represent the physical reality that the signal strength from a finger or stylus will also monotonically decrease as distance from the finger or object increases. However, the constraint of a single peak may not be correct where multiple finger inputs can be received by the touch sensor panel (e.g., a two-fingered swipe). Accordingly, some of the constraints described herein can be applied only when enough information about the object is known to justify applying the constraint. For example, if it is known that an active stylus with a single well defined tip is being used at the input device (e.g., because the active stylus communicates with the device that contains the touch sensor panel that it is being used as the input device), the constraint on a single peak may be applied. On the other hand, if the input object is unknown and the width of the calculated object profile may be consistent with a finger, multiple fingers, or a large stylus, the constraint of a single peak on the object profile may not be applied, as it may incorrectly exclude the multiple finger case.

The parameterization of the object profile and object path progression can include assumptions about the reasonable set of possible object profiles and object path progressions. For example, parameters representing the measured data can be configured to produce a higher confidence level when the measured data is consistent with the physics of the touch screen (e.g., the measurement noise is within bounds of laboratory data used to characterize the touch screen characteristics). In some example, this factor of the parameterization can be referred to as the statistical model of the behavior of the measurement apparatus. In addition, parameters representing the movement path of the object may produce a higher confidence level when the distance moved between successive frames (e.g., the velocity of movement) is consistent with typical user motion characteristics. For example, if successive frames of measured data show that the likely object location in the previous frame and the current frame are on completely opposite sides of the touch screen, the behavior may be more likely to be consistent with a finger being removed from one side of the touch screen and a different finger (or a stylus) being placed on the opposite side of the touch screen. In this scenario, the confidence level that the object profile based on previous measurement frames is correct may be lowered (e.g., because it is more likely that an object with different characteristics is providing the input). This factor in the parameterization can be referred to as a statistical model of probable object position progressions. Similarly, the parameters can also reflect that the object profiles may have certain likely characteristic shapes, for example, for different finger sizes and shapes, stylus characteristics, or the like. In some examples, this factor in the parameterization can be referred to as the prior likelihood of the profiles. When the calculated profile matches with one of the prior measured object profiles, the confidence in the calculated object profile can be higher, while the confidence in the calculated object profile can be lower when it does not match any of the prior likely object profiles. In another example, the amount of change in the profile between successive measurements can also be assumed to change slowly, or otherwise change with some expected characteristics over time. This can be referred to as a statistical model of probably changes in profiles over time. The considerations above may also be factored in to the object profile calculation in other ways. For example, the selected basis functions for object can be selected based on empirical data collected in a laboratory for different sized fingers, styli, or other anticipated objects that might be used for input.

As described above, some approaches to object profile and movement path calculation can include all previously collected frames of sensor data to provide the best estimate for the profile and movement path based on all available data. This type of approach can be suitable where the object profile is not expected to change or expected to make relatively small changes over time. In some examples, such as where the object profile is expected to change more rapidly, it may be desirable to weight more recently measured frames more heavily than previously measured frames. In this way, older, and possibly outdated, information about the object profile can have a reduced contribution to the calculation results as newer data is received. In some examples, the weighting can be included in the constraints on the profile as defined above. In some examples, an exponential function of a forgetting factor less than one can be used to weight different frames as desired to achieve a desired rate of forgetting. In some examples, the forgetting factor could weight the most recent N frames equally, and ignore all frames that are more than N frames old. It should be understood that while measurement frames are described above, in some examples the object profile progression and object position progression can be updated any time a new measurement information is received from the touch sensor panel, even if received from a single touch node at a time without departing from the scope of the present disclosure.

Figure 8A:
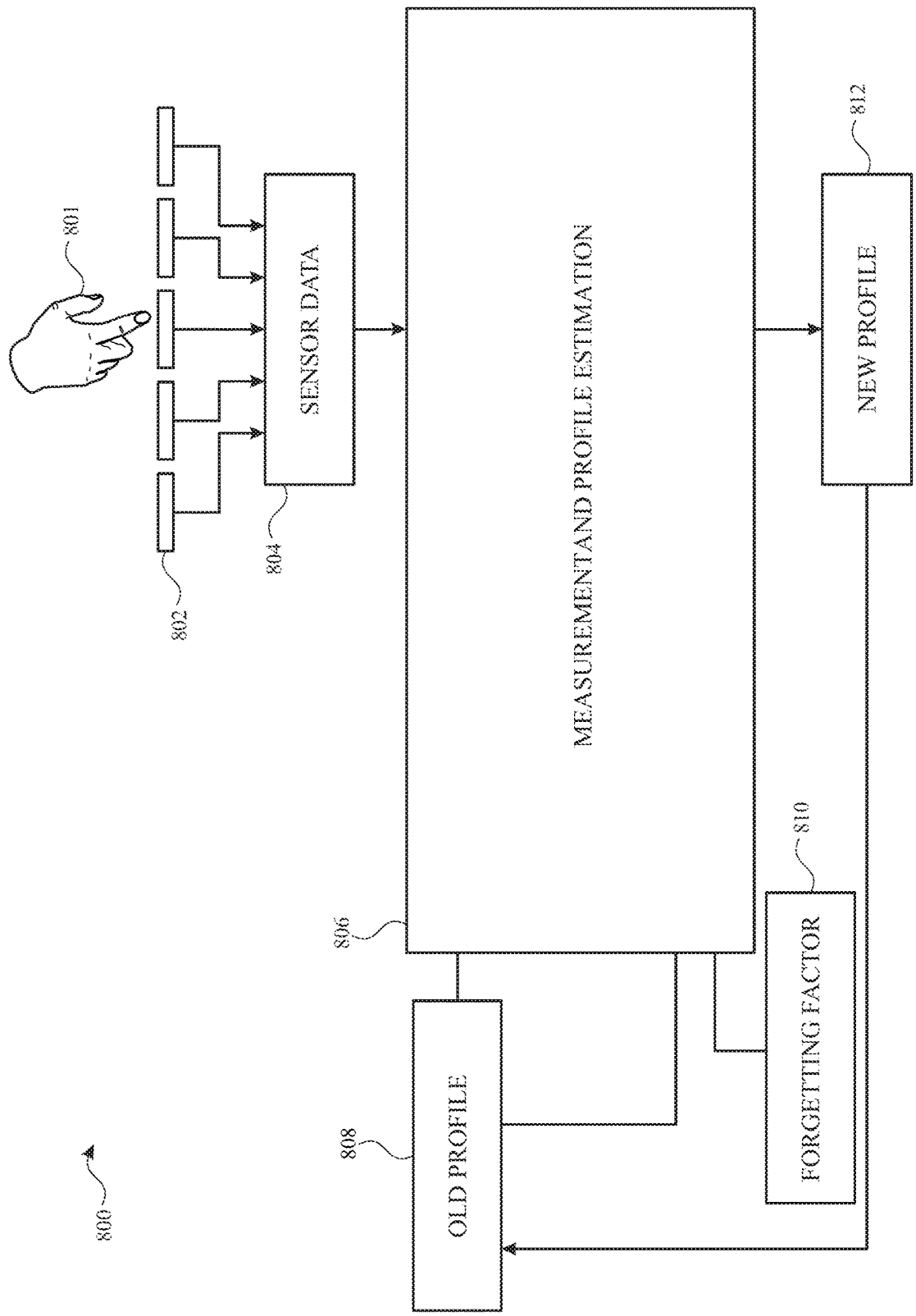
FIGS. 8A-8B illustrate exemplary architectures for generating a signal profile for an object according to examples of the disclosure.
Figure 8B:
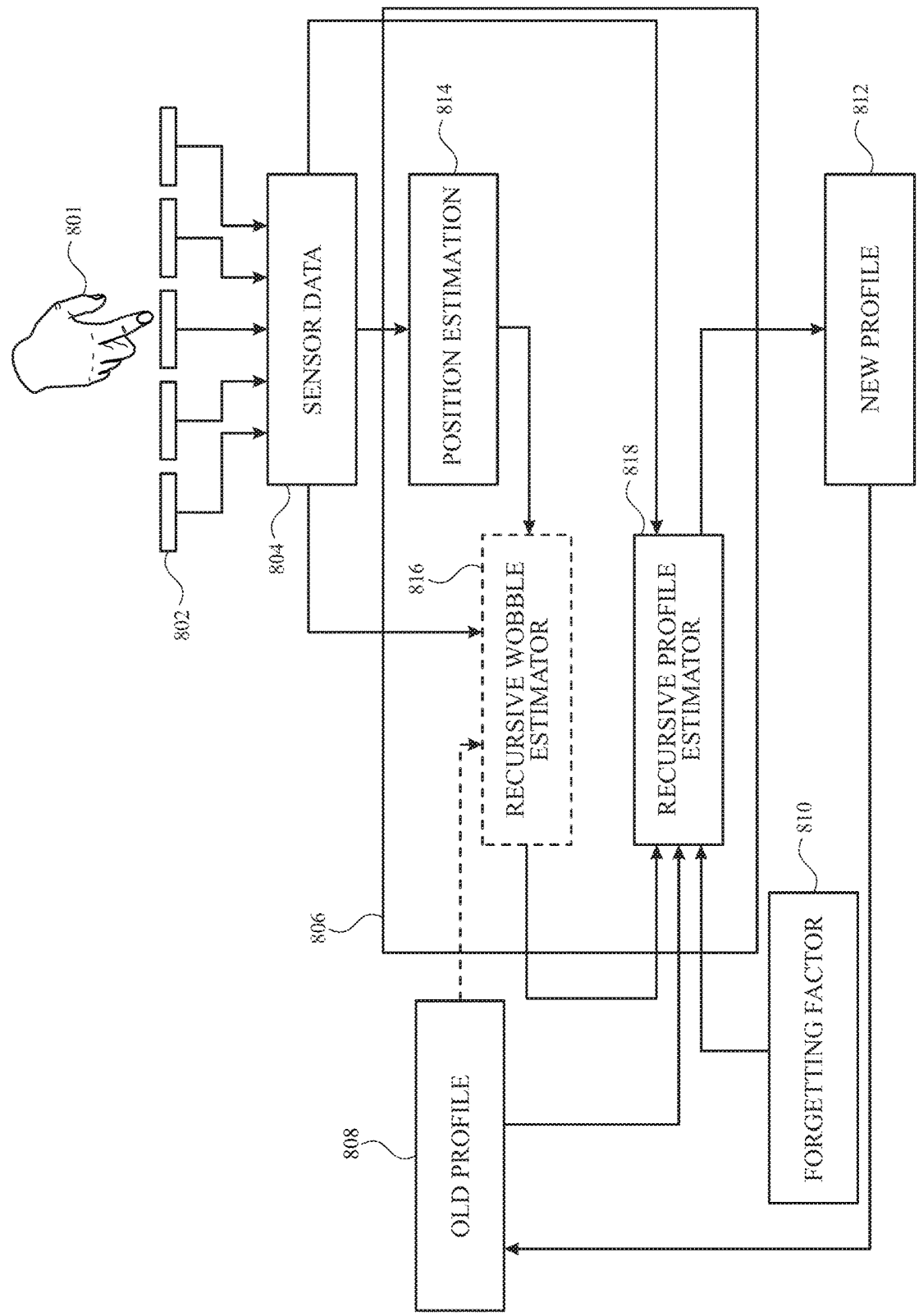

FIGS. 8A-8B illustrate exemplary architectures for generating a signal profile for an object according to examples of the disclosure. In some examples, a signal profile for an object can improve confidence in correlating measured signal values with object position relative to the touch sensor panel. In FIG. 8A, sense electrodes 802 can correspond to the sense nodes n−2 to n+2 described above with respect to FIGS. 5A-5B. Sensor data block 804 can receive electrical signals from the sensors 802, the data can be digitized and/or pre-processed before being input into a measurement and profile estimation block 806. In some examples, the measurement and profile estimation block 806 can receive an old profile 808 and a forgetting factor 810 as inputs. In some examples, when no recent data has been received at the sensors 802, the old profile 808 can begin as an initial profile estimate. In some examples, the old profile 808 can be periodically updated with a new profile 812 calculated by measurement and profile estimation block 806. The measurement and profile estimation block 806 can iteratively update the new profile 812 as sensor data is received and position estimations are calculated. In some examples, the old profile 808 can represent an expected measurement curve associated with an object. If a calculated confidence in the old profile is high, sensor data 804 that is consistent with old profile can be used for a more accurate position calculation. FIGS. 9A-9F below provide further details about the relationship between object profiles, sensor data, and position estimation in a graphical format.

In some examples, when new measured sensor data 804 is received from the sensors 802, the old profile 808 can be compared to the raw sensor data 804 for determining the accuracy of the sensor profile. In some examples, signal processing (e.g., centroiding, wobble correction) can be performed on the sensor data 804 at measurement and profile estimation block 806, and the old profile 808 can be compared to the processed sensor data 804 for determining the accuracy of the sensor profile. In some examples, a new profile can 812 can be produced based on the relationship between old profile 808 and the sensor data 804 and/or processed sensor data. In the following description, although references are made to sensor data 804 being used to update the new profile, it should be understood that further processed signal data (e.g., after wobble correction) can also be used without deviating from the scope of the present disclosure. In some examples, the new profile 812 can be formed by performing a curve fitting of the old profile 808 to the sensor data 804, and adjusting the old profile curve to reduce the amount of error between the sensor data and the old profile. The forgetting factor 810 can be used to cause a result the reliance on the old profile 808 for generating the new profile 812 to decay over time. For example, if the old profile 808 was generated based on previous input from a finger and at a later time a stylus is used to perform inputs to the touch sensor panel, the forgetting factor can be used to eliminate the influence of the finger-based old profile 808 from the generation of a new profile 812. In some examples, the forgetting factor 810 can reflect the idea that after a long period of time, there is less of a reason to expect that the same object will be used for input as was used for previous measurements and/or that the object profile has not changed (e.g., due to changes in angle, height, etc.). On the other hand, once an accurate profile has been converged upon and stored in old profile 808, subsequent measurements happening within a short period of time can benefit from increased measurement accuracy associated with having an accurate profile available. In some examples, the forgetting factor 810 can be used to allow the estimated profile to persist even if the object providing an input is briefly removed from the vicinity of the touch sensor panel. In some examples, in addition to the forgetting factor 810, a position check can be used to determine how strongly the old profile 808 can be relied upon. For example, if a first input occurs in a first location and an old profile 808 is formed for the object performing the input in the first location, a subsequent input near the first location can likely be the same object. In some examples, a position check against prior inputs could be incorporated in the forgetting factor 810. In some other examples, a position check can instead be used separately as an additional calculation factor, e.g., as part of the parameterization of the object position as described above. Although FIG. 8A illustrates a single old profile 808 and new profile 812, it should be understood that multiple profiles can be calculated when multiple input objects are being detected simultaneously. In such an example, multiple old profiles 808 can be simultaneously maintained and updated with new profiles 812 for different objects proximate to the touch sensor panel.

FIG. 8B illustrates one example configuration for measurement and profile estimation block 806 of FIG. 8A. As shown, the measurement and profile estimation block 806 can include a position estimation block 814, a recursive wobble estimator 816, and a recursive profile estimator 818. In some examples, the position estimation block 814 can estimate the object position based on the sensor data 804. In some examples, the position estimation can be calculated based on a weighted or unweighted centroid calculation. As further described above, the centroid calculation can suffer from the effects of wobble, and thus a recursive wobble estimator 816 can be used to compensate for the wobble effects. The recursive wobble estimator 816 can receive the sensor data 804, centroid data from position estimation block 814, and old profile data 808. In some examples, only the centroid data 814 or the sensor data 804 can be used by the recursive wobble estimator 816 along with the old profile data 808. The recursive wobble estimator 816 can use the profile data from the old profile 808 in combination with the sensor data 804 and/or centroid data 814 to compensate for the wobble effect, as illustrated in FIGS. 9D and 9F below. In some examples, as the profile more accurately reflects the characteristics of the object (e.g., finger, stylus, etc.), the wobble estimator 816 can provide a greater reduction of wobble in the final position estimate 820 output by the recursive wobble estimator. As noted above, increasing accuracy of the estimated profile can enhance the wobble correction of the recursive wobble estimator, and accordingly a recursive profile estimator 818 can be used in conjunction with the recursive wobble estimator 816. In some examples, the recursive profile estimator can receive the final position estimate 820 from the recursive wobble estimator 816, the old profile, and a forgetting factor 810. In some examples, the recursive profile estimator 818 can also receive the sensor data 804 either in addition to or in place of the final position estimate 820. The forgetting factor 810 can be used by the recursive profile estimator as described above in the description of FIG. 8A.

The recursive profile estimator 818 of FIG. 8B can be implemented in a number of different ways. As mentioned above, the object profiles can be parameterized using either a linear or non-linear parameterization. Accordingly, generating the new profile in the recursive profile estimator can be implemented as an algorithm that can solve for parameter values of the parameterization of the object profile. In some examples, the old profile 808 and new profile 812 can be represented by a Fourier representation and characterized by Fourier coefficients. In some examples, a sinusoidal approximation of a Gaussian distribution can be used for the old profile 808 and new profile 812 curves. It should be understood parametric approximations can also be used to represent an object profile without departing from the scope of the present disclosure. As stated above, different variations of Kalman filters, brute force numerical optimization, neural-nets, or other optimization techniques known in the art can be used to calculate the object profile while remaining within the scope of the present disclosure.

As stated above, in some examples, the recursive profile estimation can be performed with a Kalman filter. In some examples, in the case of a linear parameterization of the object and a non-linear parameterization of the object position, a simple or conventional Kalman filter may not be capable of handling the non-linear parameterization of the object position estimation. In such a case, an extended Kalman filter, an unscented Kalman filter, or a modified Kalman filter can be used to handle the combination of linear and non-linear parameters. In one exemplary modified Kalman filter implementation, the recursive filter can alternate between calculating values for the linear parameters of the object profile and the non-linear parameters of the object position. In some examples, an initial calculation for the object position can be provided by a centroid calculation of the sensor measurements for a particular frame. This initial calculation of the object position can be used during the first iteration of calculating the linear parameters of the object profile. Once the object profile is updated based on the initial estimate, the non-linear parameters of the object position can be calculated based on the updated object profile parameters calculated during the first iteration of linear parameter calculation. These steps can be repeated for multiple iterations switching back and forth between linear and non-linear calculations to improve the confidence in the correctness of the object profile and object position based on the object profile progression and object position progression over multiple frames of data as the object moves relative to the touch sensor panel. The Kalman filter implementation can be useful because the information about the object profile and object position maintained by the Kalman filter can reflect information from previous measurement frames, and as new data comes in, the previous measurement frame data remains factored when the new object profile estimate and object position are calculated by the modified Kalman filter. In some examples, as discussed above, constraints may also be applied to the object profile and object position. In such cases, a constrained Kalman filter may be used to properly include the effect of the constraints on the object profile and object position.

Figure 9A:
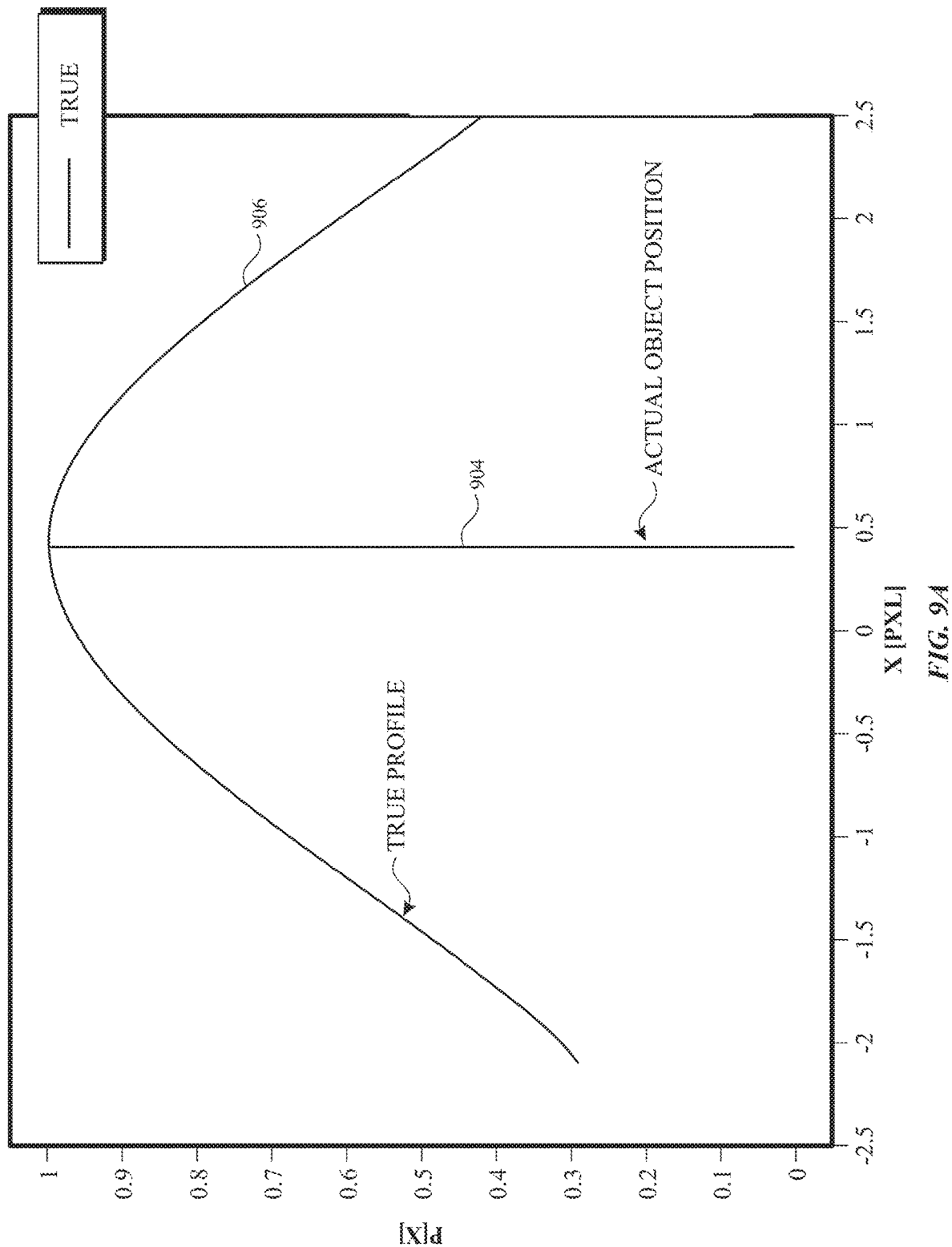
FIGS. 9A-9F illustrate exemplary plots of sensor data, object positions, and position estimates, and wobble according to examples of the disclosure.
Figure 9B:
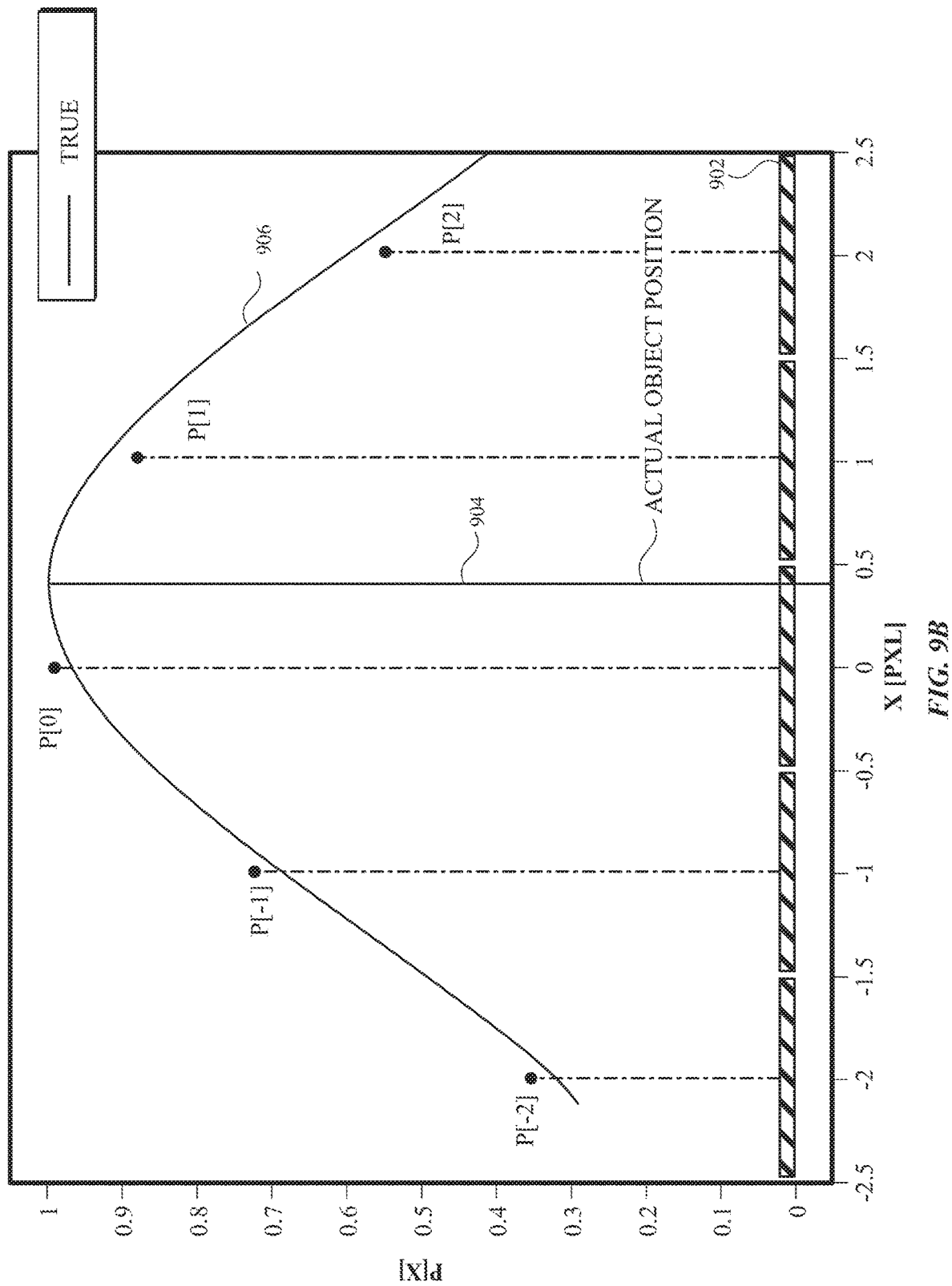
Figure 9C:
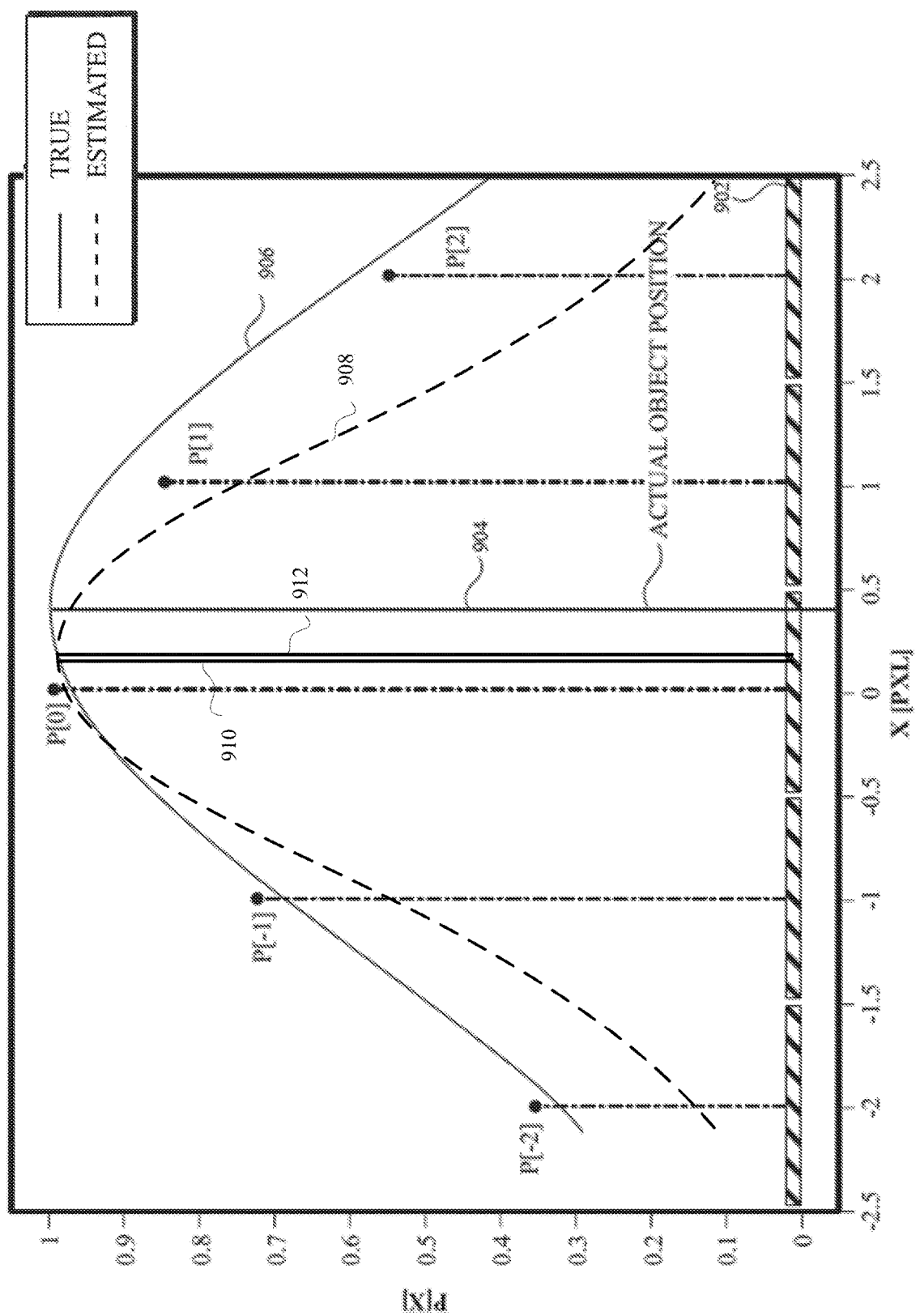
Figure 9D:
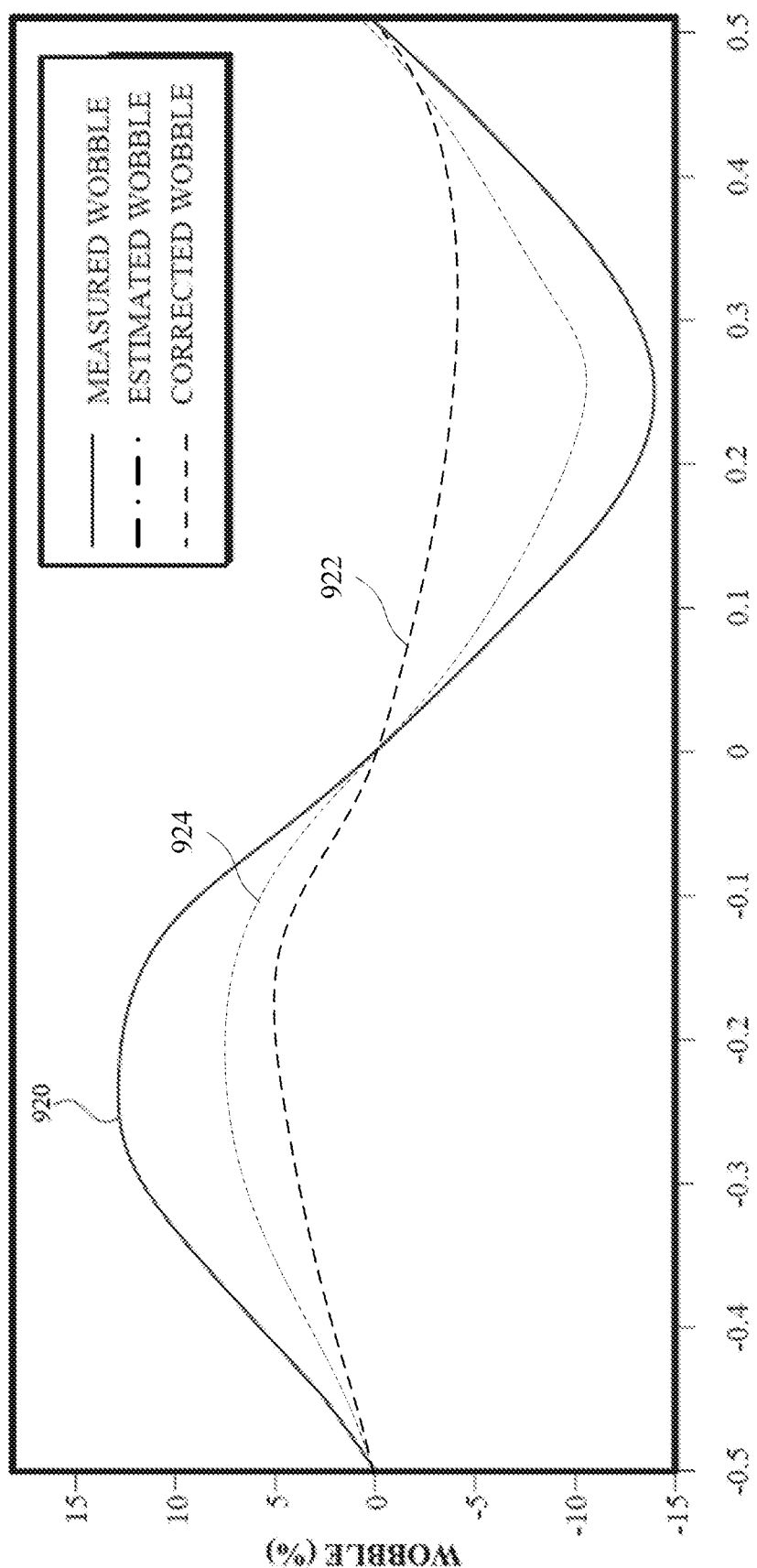

FIGS. 9A-9D present a graphical representation of an exemplary profile estimation process (e.g., at measurement and profile estimation block 806 above) according to examples of the disclosure. FIG. 9A illustrates an exemplary continuous profile of an object at an actual object position 904 relative to a plurality of sensor electrodes. The x-axis of FIG. 9A can correspond to touch sensor positions similar to the x-axes described above with regard to FIG. 4. FIG. 9B introduces corresponding touch sensors 902 that are illustrated along the x-axis as a reference point for the x-axis values. Accordingly, each span of 1 unit on the x-axis can correspond to the size of a sensor 902. The y-axis can represent output signal values (e.g., $S_{N-2}$ to $S_{N+2}$ in FIGS. 5A-5B above) measured at each of the sensors 902. However, variations in the measurement can occur at sensors 902 based on the geometry, electrical characteristics, and relative positioning of the object to the sensors as described above with regards to FIGS. 5A-6D. Line segment 904 can represent an actual position of an object hovering above or in contact with a touch sensor panel that can include the sensors 902. As the true profile represents the signal that an ideal measurement would produce, it should be expected that the actual position of the object 904 is centered at the peak of the continuous profile 906. This shows again that the true profile can represent a measurement by a sensor at any location with respect to the center of the object as described above in FIG. 4. FIG. 9B illustrates sensor measurement data for sensors 902 labeled as P[−2] through P[+2] for each of the five sensors 902 corresponding to an object having the true signal profile 906 at the actual object position 904. The index value X in P[X] corresponds to an arbitrary index where the central sensor of the sensors 902 has an index of zero at its center, and sensors to the left have negative index values while pixels to the right have positive index values. The data values shown in FIG. 9B further show an example of how discrete measurements from each of the sensors P[−2] to P[2] may differ from the measurements expected by the true profile. As described above, the distance between the sensors X can correspond to the pixel and/or node pitch of the electrodes in the touch screen. As shown, the actual finger position 904 is located between the sensors corresponding to sensor values P[1] and P[0], the two highest sensor values as would be expected for a single finger or a stylus.

FIG. 9C introduces an initial object profile estimate 908, a centroid 910 position estimate and a wobble correction 912 position estimate. As shown, using the initial estimated profile 908, the wobble correction 912 position estimate can be closer to the actual finger position 904 than centroid 910 position estimate. This concept is illustrated graphically in FIG. 9D below. However, in some examples, if the initial profile estimate is not close to the true object profile 906, measurement corrections using the initial estimate, such as wobble correction, may not be more accurate than a simple centroid calculation. Accordingly, the accuracy of wobble estimate 912 can depend on how closely estimated profile 908 approximates the true profile 904. For example, for a touch sensor panel that is designed to work with a stylus of known size and shape (and accordingly a well-understood profile), a very accurate wobble correction 912 position estimate can be obtained based on sensor data P[X]. The wobble correction 912 position estimate can be calculated by using the estimated profile 908 to compensate for the expected wobble associated with the estimated profile. As seen in FIG. 9C, the initial estimated profile 908 may deviate from the measured sensor data points. Using the techniques described above regarding FIGS. 7 and 8A-8B, the error between the measured data and the estimated object profile 908 can be reduced as additional frames of data are obtained with the object at different positions (e.g., sub-pixel positions) on the panel.

FIG. 9D illustrates an exemplary wobble correction using an initial object profile (e.g., initial estimated profile 908 above) according to examples of the disclosure. The x-axis of the graph can represent an x-coordinate of an object relative to the center of a single sensor (e.g., one of sensors 902 in FIG. 9C), and the y-axis can represent a percentage of wobble in the position estimate for a corresponding object position. Curve 920 can represent a wobble percentage in the position calculation for the corresponding object position above the sensor without any wobble correction (e.g., the wobble of the true profile 906). Curve 924 can represent an amount of wobble associated with the initial object profile estimate. Curve 922 can represent a percentage of wobble for the same object positions after a wobble correction (e.g., at recursive wobble estimator 816) utilizing the initial object profile (e.g., profile 916 in FIG. 9E). In some examples, the amount of wobble after wobble correction can be partially reduced compared to the measured wobble position as illustrated by the difference in wobble in curves 920 and 922. In some examples, if the object (e.g., finger) characteristics deviate significantly from the expected profile (e.g., the user touches the touch sensor panel with a finger when input from the stylus is expected), the corrected wobble from a wobble correction algorithm can potentially be worse than the uncorrected wobble.

Figure 9E:
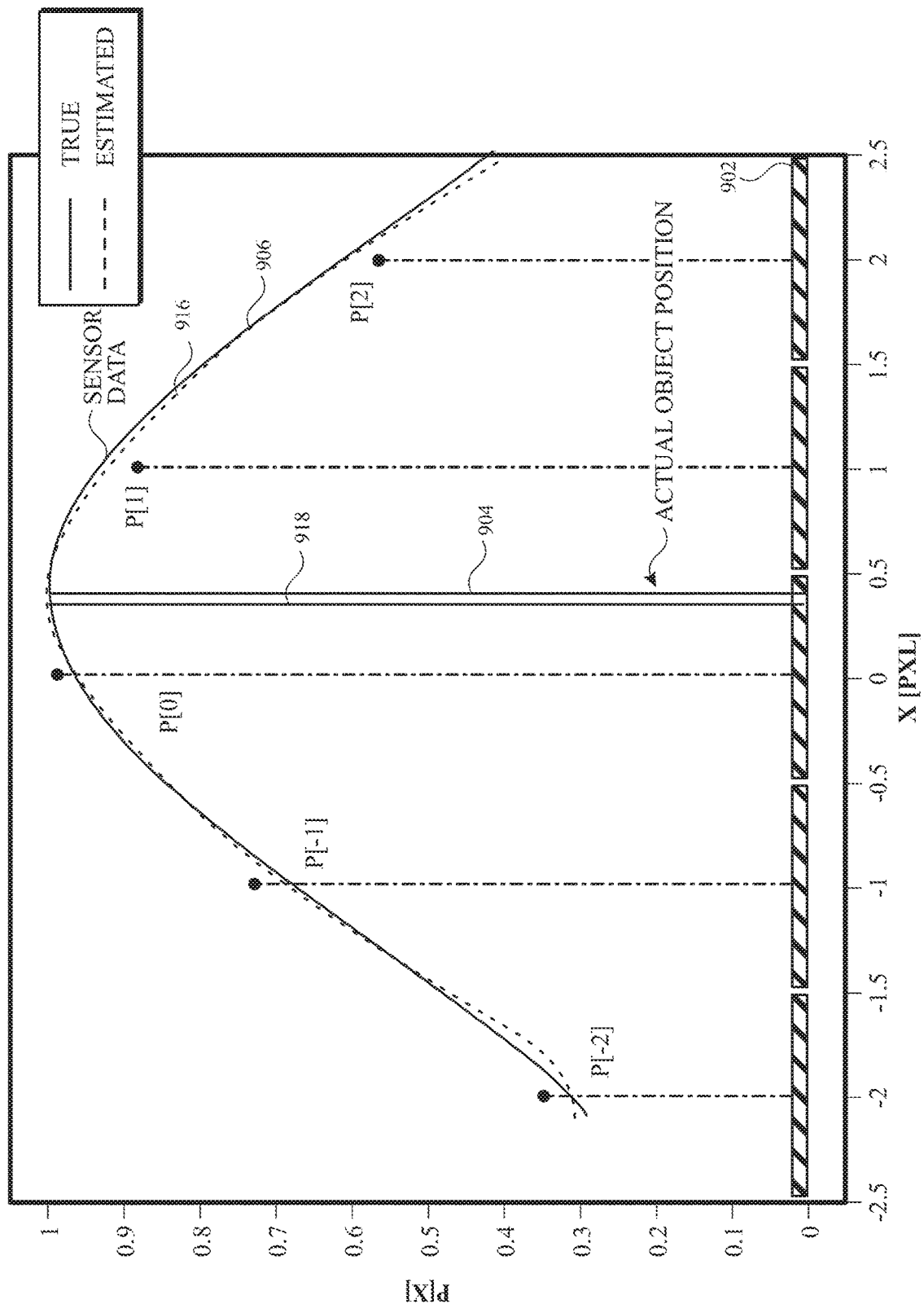
Figure 9F:
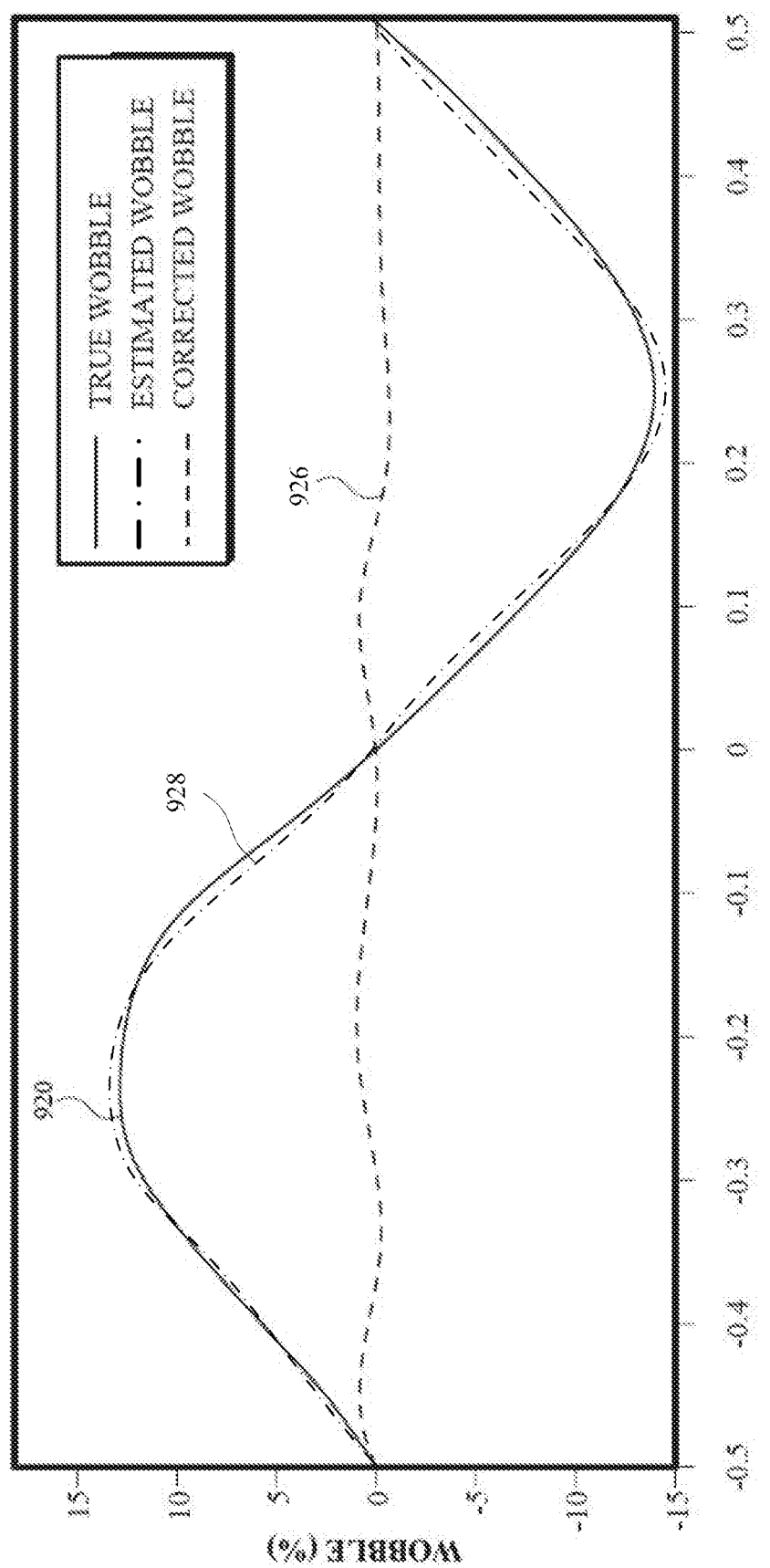

FIG. 9E illustrates an exemplary new profile 916 that can be generated (e.g., at recursive profile estimator 818) based upon the sensor data P[X] and position calculations. The new profile 916 shown in FIG. 9E can be generated based on the previous profile estimate 908 and one or more of the sensor data P[X], an updated wobble correction estimate 918 shows that, as a result of the improved object profile estimate, the calculated position can move closer to the actual object position 904. As explained above, calculating the new profile 916 can be generalized as fitting a curve to reduce error between the true profile 904 and the new profile 916 using current and past sensor data and object position estimates. In some examples, several measurement iterations may occur between the estimated profile 906 and the new profile 916 that closely resembles the true profile 908 as shown in FIG. 9E. In addition, several iterations of analysis of the incoming data for a single frame may be used to obtain a good fit between the sensor data, the updated object position 918, and the new profile 916.

It should be understood that FIG. 9E represents a relatively simple case for object profile estimation. As shown, the true profile 906 has a symmetrical profile that can be represented by a symmetrical curve. In addition, noise in signal measurement can reduce the reliability of wobble correction and object position estimation.

It should be understood that many different mathematical models can be used to generate the profile curves (e.g., at recursive profile estimator 818 above) and for performing wobble correction (e.g., at recursive wobble estimator 816 above) while remaining within the scope of the disclosure.

FIG. 9F illustrates an exemplary wobble correction when an accurate object profile is available (e.g., the object profile 916 in FIG. 9E). The x-axis of the graph can represent an x-coordinate of an object relative to the center of a single sensor (e.g., one of sensors 902 in FIG. 9E), and the y-axis can represent a percentage of wobble in the position estimate for a corresponding object position. Curve 920 can represent a wobble percentage in the position calculation for the corresponding object position above the sensor without any wobble correction (e.g., the wobble of the true profile 906). Curve 928 can represent an amount of wobble associated with the accurate profile estimate. As seen in FIG. 9F, the amount of wobble associated with the accurate profile estimate can be very close to the amount of wobble of the true profile. Curve 926 can represent a percentage of wobble for the same object positions after a wobble correction (e.g., at recursive wobble estimator 816) utilizing the accurate object profile (e.g., profile 916 in FIG. 9E). In some examples, the amount of wobble after wobble correction can be significantly reduced compared to the measured wobble position as illustrated by the difference in wobble in curves 920 and 926. In some touch sensor systems, only a single input object (e.g., a proprietary stylus) may be expected for use as an input device, and in such a known profile of the stylus can be used to enhance wobble correction. However, if a user of the same device tries to use a finger to perform an input on the same device, the stylus-specific profile data used by the wobble correction may not be accurate for a finger and can render the correction much less effective causing a greater amount of wobble may appear in the data. As described above, the object profile is not necessarily known in advance. In such examples, object profile estimation according to examples of the disclosure can improve measurement performance by allowing for correction of measurement data using the estimated profile. Some examples where an object profile might not be known in advance are changing between fingers and a stylus as input device, different users with different finger sizes, and/or multiple different input objects (e.g., multi-touch, multi-finger gestures, etc.) providing input to a touch sensor panel.

In one example, the wobble correction described in FIG. 9F could be used to obtain reduced wobble during a straight line input (e.g., a line drawn across the touch sensor panel using a ruler). One example of the position error associated with such a straight line drawn using position estimation based only on a single frame of sensor data is shown above in FIG. 6B. Before a good object profile estimate is created (e.g., as shown by initial profile estimate 908 in FIG. 9C above) an initial portion of a straight line may have a relatively large wobble and the wobble may improve as the object continues to move and the profile estimate improves as more sensor data is used to improve the object profile estimate. Thus, before the object profile calculation is able to converge, a straight line input (e.g., drawing a straight line along a rule or straight edge) may have a larger initial wobble prior to object profile estimation resulting in a distortion at the beginning of the line. In some examples, after detecting that an input corresponds to a straight line, the beginning segment of the line can be adjusted (e.g., straightened) to correct the relatively large wobble at the beginning of the line drawing. In one example, the straight portion of drawn line segment can be extended back toward the approximate location of the initial detected input point for the line. Similarly, other shapes drawn tracing (e.g., geometric shapes, French curves, protractors, etc.), can receive similar correction of an initial segment that may be drawn during an initial phase of object profile estimation. In some examples, a line or arc segment could be corrected based on the determined shape of the input after object profile estimation can mitigate the effects of wobble on the input. In an alternative example, a drawing application that receives input from a touch sensor panel according to the present disclosure may hide a drawing input during an initial phase of acquiring an object profile and once the object profile estimate attains a threshold confidence level, the drawing application may show the drawing input. In contrast, if points along the same line are touched by the identical object as the immediately preceding straight line drawing example but the time between each input is long relative to a forgetting factor, each of the inputs may have the same larger amount of wobble (e.g., corresponding to the initial phase of the object profile estimation) because the object profile can return to an initial profile estimate between each subsequent input.

Figure 10A:
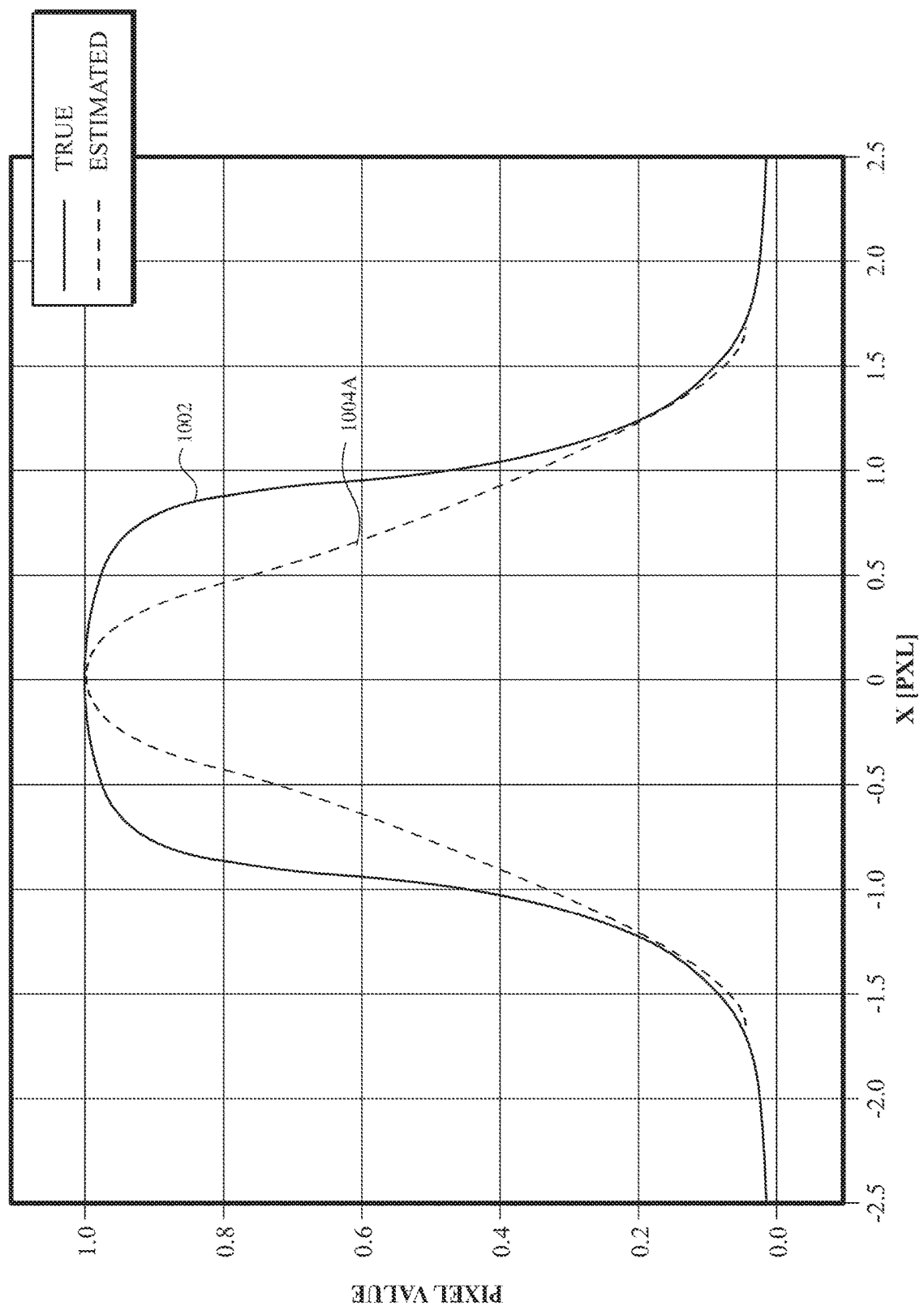

FIGS. 10A-10B illustrate an exemplary progression of a profile estimate algorithm where an initial profile 1004A is narrower than the true profile 1002. In some examples, wide signal profiles can correspond to large fingers, thumbs, or large tipped stylus form factors. FIG. 10B shows an exemplary estimated profile 1004B after additional measurement data 1006 is obtained and/or addition cycles of recursive profile estimation are performed according to examples of the disclosure. As can be seen in FIG. 10B, the estimated profile 1004B can converge more closely to the true profile 1002. Accordingly, when the estimated profile 1004B is used in a wobble correction algorithm (e.g., recursive wobble estimator 816) can be used to provide more accurate wobble estimation without knowing the exact object profile in advance of any sensor measurements. Although FIGS. 10A-10B illustrate only one convergence of profile estimation for a particular true profile, it should be understood that the profile estimation can converge for multiple different true profiles. In other words, using a recursive profile estimate, accurate profile estimates for different sizes of fingers, styluses, and other detectable objects can be obtained.

In some examples, a single initial estimate can be used regardless of any measurements received by the object profile estimation. In some examples, the single initial estimate can be chosen to correspond to an approximately central point between a narrowest expected true profile and a widest expected true profile. Such an initial profile selection can allow for a relatively uniform convergence time of the object profile estimation regardless of the actual size of the object and its associated profile. In some examples, an initial estimate can be selected from two or more stored initial estimates to use as a starting point for object profile estimation. In one example, an initial stylus estimate and an initial finger estimate can be stored. In some examples, if a first sensor measurement is determined to be more likely consistent with a stylus, the initial stylus measurement can be used as an entry point into the object profile estimation. On the other hand, if a first sensor measurement is determined to be more likely consistent with a finger, the initial finger measurement can be used as an entry point into the object profile estimation. The benefit of multiple profiles can be that if a correct initial profile estimate is selected for the initial estimate, a faster convergence can be obtained between the estimated profile and the true profile of the object. On the other hand, if the initial profile estimate turns out to be incorrectly selected (e.g., the initial stylus estimate is selected and the object is a large finger) the object profile estimation can take longer than the case where a single initial estimate as described above would be used. In some examples, the one or more potential initial estimates can be selected such that the object profile estimation can eventually converge regardless of the true profile of the object.

Therefore, according to the above, some examples of the disclosure are directed to a method comprising obtaining a plurality of measurements of an object at a touch sensor panel captured at different times and different positions of the object relative to the touch sensor panel; and based on the data in the plurality of measurements for multiple different positions of the object, determining an object profile progression and an object position progression. Additionally or alternatively to one or more of the examples disclosed above, in some examples, the object profile is represented in a parameterized form. Additionally or alternatively to one or more of the examples disclosed above, in some examples, the parameterization comprises a list of possible profiles. Additionally or alternatively to one or more of the examples disclosed above, in some examples, the parameterization of the object profile is linear sum of basis functions multiplied by the parameters. Additionally or alternatively to one or more of the examples disclosed above, in some examples, determining the profile progression and the object position progression comprises applying a statistical model of the behavior of the measurement apparatus. Additionally or alternatively to one or more of the examples disclosed above, in some examples, determining the profile progression and the object position progression comprises applying a statistical model of a prior likelihood of the profiles. Additionally or alternatively to one or more of the examples disclosed above, in some examples, applying the statistical model of the prior likelihood of the profiles includes applying constraints in which certain profiles are considered impossible. Additionally or alternatively to one or more of the examples disclosed above, in some examples, determining the profile progression and the object position progression comprises applying a statistical model of probable changes in profiles over time. Additionally or alternatively to one or more of the examples disclosed above, in some examples, determining the profile progression and the object position trajectory comprises applying a statistical model of probable object position progressions. Additionally or alternatively to one or more of the examples disclosed above, in some examples, determining the object profile progression and the object position progression utilizes a Kalman type filter. Additionally or alternatively to one or more of the examples disclosed above, in some examples, the object profile parameterization is linear. Additionally or alternatively to one or more of the examples disclosed above, in some examples, a statistical model of behavior of the touch sensor panel comprises assuming that measurement errors will be zero mean normally distributed and uncorrelated between successive measurements and uncorrelated between individual sensors in a single measurement frame. Additionally or alternatively to one or more of the examples disclosed above, in some examples, a statistical model of possible profiles is normally distributed about a mean profile with constraints that the mean profile must be positive and with an outward pointing gradient. Additionally or alternatively to one or more of the examples disclosed above, in some examples, a statistical model of how a profile changes in time the change in the profile is zero mean normally distributed, uncorrelated between successive measurements and uncorrelated between parameters of the parameterization of the object profile. Additionally or alternatively to one or more of the examples disclosed above, in some examples, a statistical model of the object position progression treats all object position progressions as equally likely. Additionally or alternatively to one or more of the examples disclosed above, in some examples, a statistical model of the object position progression treats all object position progressions as equally likely. Additionally or alternatively to one or more of the examples disclosed above, in some examples, applying one or more statistical models is performed with a Kalman type filter. Additionally or alternatively to one or more of the examples disclosed above, in some examples, the Kalman type filter is a modified Kalman filter that performs a recursive calculation of object position and object profile for the most recently captured measurement frame. Additionally or alternatively to one or more of the examples disclosed above, in some examples, the modified Kalman filter iteratively alternates between calculating linear parameters of the object profile and a non-linear representation of the object position.

Some examples of the disclosure are directed to a method comprising obtaining one or more sensor measurement frames at the touch sensor panel, calculating a first object profile based on the one or more first sensor measurement frames, obtaining a new measurement frame at the touch sensor panel, calculating a first object position based on the new measurement frame and the first object profile, and calculating a second object profile based on the first object position, the first object profile, and the new measurement frame. Additionally or alternatively to one or more of the examples disclosed above, in some examples, the calculation of the first object profile includes data from each frame of the one or more sensor measurement frames. Additionally or alternatively to one or more of the examples disclosed above, in some examples, a weighting is applied to each frame of the one or more first sensor measurement frames, the weighting based at least in part on how recently each corresponding frame of the one or more first sensor measurement frames was captured. Additionally or alternatively to one or more of the examples disclosed above, in some examples, the weighting limits a number of frames of the one more first sensor measurement frames considered in the calculation of the first object profile to be less than or equal to a maximum number of considered frames. Additionally or alternatively to one or more of the examples disclosed above, in some examples, the weighting is adjusted in accordance with a determination that a change in the object profile is indicative of an amount of change in the object profile threshold exceeding a predetermined limit. Additionally or alternatively to one or more of the examples disclosed above, in some examples, the weighting comprises increasing applying a forgetting factor that applies a greater weight to more recently obtained measurement frames than less recently obtained measurement frames. Additionally or alternatively to one or more of the examples disclosed above, in some examples, the method further comprises calculating a second object position based on the new measurement frame and the second object profile. Additionally or alternatively to one or more of the examples disclosed above, in some examples, the method further comprises recursively calculating a plurality of object positions and a plurality of object profiles until a threshold confidence level in a current object position and current object profile is reached. Additionally or alternatively to one or more of the examples disclosed above, in some examples, recursively calculating the plurality of object positions and the plurality of object profiles is performed by a Kalman filter, an extended Kalman filter, an unscented Kalman filter, a modified Kalman filter or a constrained Kalman filter. Additionally or alternatively to one or more of the examples disclosed above, in some examples, a difference between an actual position of the object and the first object position is greater than a difference between the actual position of the object and the second object position. Additionally or alternatively to one or more of the examples disclosed above, in some examples, calculating the second object profile comprises: determining whether an amount of change between the first object profile and the second object profile exceeds a threshold amount of change, and in accordance with a determination that the amount of change does not exceed the threshold amount of change, including the first object profile in the calculation of the second object profile, and in accordance with a determination that the threshold amount of change exceeds the threshold amount of change, discarding the first object profile and calculating the second object profile based on the new measurement frame. Additionally or alternatively to one or more of the examples disclosed above, in some examples, the second object profile estimate is based on data from each of the one or more first measurement frames and data from the new measurement frame. Additionally or alternatively to one or more of the examples disclosed above, in some examples, calculating the first object position comprises generating a centroid calculation on data of the new measurement frame, and correcting for wobble in the centroid calculation based on the first object profile.

Some examples of the disclosure are directed to non-transitory computer readable storage medium storing instructions to perform a method of a computing device including a touch sensor panel, the method comprising obtaining one or more sensor measurement frames at the touch sensor panel, calculating a first object profile based on the one or more first sensor measurement frames, obtaining a new measurement frame at the touch sensor panel, calculating a first object position based on the new measurement frame and the first object profile, and calculating a second object profile based on the first object position, the first object profile, and the new measurement frame.

Some examples of the disclosure are directed to a non-transitory computer readable storage medium storing instructions to perform a method of a computing device including a touch sensor panel, the method comprising obtaining one or more sensor measurement frames at the touch sensor panel, calculating a first object profile based on the one or more first sensor measurement frames, obtaining a new measurement frame at the touch sensor panel, calculating a first object position based on the new measurement frame and the first object profile, and calculating a second object profile based on the first object position, the first object profile, and the new measurement frame.

Some examples of the disclosure are directed to a method comprising receiving a first plurality of inputs from an object at a touch sensor panel, based on the first plurality of inputs, obtaining an object profile estimate of the object, receiving a second plurality of inputs from the object at the touch sensor panel, applying the object profile estimate to the second plurality of inputs, determining whether the second plurality of inputs correspond to a pre-defined shape, and in accordance with a determination that the second plurality of inputs corresponds to the pre-defined shape, adjusting the first plurality of inputs to coincide with the pre-defined shape. Additionally or alternatively to one or more of the examples disclosed above, in some examples, the pre-defined shape is a line, and adjusting the first plurality of inputs to coincide with the line comprises redrawing the portion of the line associated with the first plurality of inputs as an extension of the line.

Some examples of the disclosure are directed to a non-transitory computer readable storage medium storing instructions to perform a method of a computing device including a touch sensor panel, the method comprising obtaining a plurality of measurements of an object at the touch sensor panel captured at different times and different positions of the object relative to the touch sensor panel; and based on the data in the plurality of measurements for multiple different positions of the object, determining an object profile progression and an object position progression.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method comprising:
    obtaining a plurality of measurements of an object at a touch sensor panel captured at different times and different positions of the object relative to the touch sensor panel over multiple successive frames; and
    based on the data in the plurality of measurements for multiple different positions of the object, determining an object profile progression and an object position progression;
    wherein an object profile estimate is a profile of touch signals for a particular object type at different positions; and
    wherein the object profile progression is a series of object profile estimates over the multiple successive frames.

2. The method of claim 1, wherein the object profile estimate is represented in a parameterized form by parameters.

3. The method of claim 2, wherein the parameterization comprises a collection of possible object profile estimates.

4. The method of claim 2, wherein the parameterization of the object profile estimate is a linear sum of basis functions multiplied by the parameters.

5. The method of claim 1, wherein the object position progression comprises applying a statistical model of a behavior of the touch sensor panel.

6. The method of claim 1, wherein determining the object profile progression and the object position progression comprises applying a statistical model of a prior likelihood of the object profile estimates.

7. The method of claim 6, wherein applying the statistical model of the prior likelihood of the object profile estimates includes applying constraints in which certain object profile estimates are considered impossible.

8. The method of claim 1, wherein determining the profile progression and the object position progression comprises applying a statistical model of probable changes in object profile estimates over time.

9. The method of claim 1, wherein determining the object profile progression and the object position progression comprises applying a statistical model of probable object position progressions.

10. The method of claim 1, wherein determining the object profile progression and the object position progression utilizes a Kalman type filter.

11. The method of claim 2, wherein the object profile estimate parameterization is linear.

12. The method of claim 10, wherein a statistical model of behavior of the touch sensor panel comprises assuming that measurement errors will be zero mean normally distributed and uncorrelated between successive measurements and uncorrelated between individual sensors in a single measurement frame.

13. The method of claim 10, wherein a statistical model of possible object profile estimates is normally distributed about a mean profile with constraints that the mean profile must be positive and with an outward pointing gradient.

14. The method of claim 10, wherein a statistical model of how an object profile estimate changes in time is zero mean normally distributed, uncorrelated between successive measurements and uncorrelated between parameters of the parameterization of the object profile estimate.

15. The method of claim 10, wherein a statistical model of the object position progression treats all object position progressions as equally likely.

16. A non-transitory computer readable storage medium storing instructions that, when executed by a computing device including a touch sensor panel and one or more processors, cause the computing device to:
obtain a plurality of measurements of an object at the touch sensor panel captured at different times and different positions of the object relative to the touch sensor panel over multiple successive frames; and
based on the data in the plurality of measurements for multiple different positions of the object, determine an object profile progression and an object position progression;
wherein an object profile estimate is a profile of touch signals for a particular object type at different positions; and
wherein the object profile progression is a series of object profile estimates over the multiple successive frames.

17. The non-transitory computer readable storage medium of claim 16, wherein the object profile estimate is represented in a parameterized form by parameters.

18. The non-transitory computer readable storage medium of claim 17, wherein the parameterization of the object profile estimate is a linear sum of basis functions multiplied by the parameters.

19. The non-transitory computer readable storage medium of claim 16, wherein the object position progression comprises applying a statistical model of a behavior of the touch sensor panel.

20. The non-transitory computer readable storage medium of claim 16, wherein determining the object profile progression and the object position progression comprises applying a statistical model of a prior likelihood of the object profile estimates.

21. The non-transitory computer readable storage medium of claim 16, wherein determining the profile progression and the object position progression comprises applying a statistical model of probable changes in object profile estimates over time.

22. The non-transitory computer readable storage medium of claim 16, wherein determining the object profile progression and the object position progression comprises applying a statistical model of probable object position progressions.

23. The non-transitory computer readable storage medium of claim 16, wherein determining the object profile progression and the object position progression utilizes a Kalman type filter.

24. A device comprising:
a touch sensor panel; and
one or more processors configured to:
obtain a plurality of measurements of an object at the touch sensor panel captured at different times and different positions of the object relative to the touch sensor panel over multiple successive frames; and
based on the data in the plurality of measurements for multiple different positions of the object, determine an object profile progression and an object position progression;
wherein an object profile estimate is a profile of touch signals for a particular object type at different positions; and
wherein the object profile progression is a series of object profile estimates over the multiple successive frames.

25. The device of claim 24, wherein the object profile estimate is represented in a parameterized form by parameters.

26. The device of claim 25, wherein the parameterization comprises a collection of possible object profile estimates.

27. The device claim 25, wherein the parameterization of the object profile estimate is a linear sum of basis functions multiplied by the parameters.

28. The device of claim 24, wherein the object position progression comprises applying a statistical model of a behavior of the touch sensor panel.

29. The device of claim 24, wherein determining the object profile progression and the object position progression comprises applying a statistical model of a prior likelihood of the object profile estimates.

30. The device of claim 24, wherein determining the profile progression and the object position progression comprises applying a statistical model of probable changes in object profile estimates over time.

31. The device of claim 24, wherein determining the profile progression and the object position progression comprises applying a statistical model of probable object position progressions.

32. The device of claim 24, wherein determining the object profile progression and the object position progression utilizes a Kalman type filter.

* * * * *